United States Patent
Jeon

(10) Patent No.: US 12,525,296 B2
(45) Date of Patent: Jan. 13, 2026

(54) MEMORY DEVICE AND OPERATING METHOD OF THE MEMORY DEVICE

(71) Applicant: SK hynix Inc., Icheon-si (KR)

(72) Inventor: Nam Cheol Jeon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 279 days.

(21) Appl. No.: 18/071,979

(22) Filed: Nov. 30, 2022

(65) Prior Publication Data

US 2024/0013837 A1    Jan. 11, 2024

(30) Foreign Application Priority Data

Jul. 6, 2022   (KR) .................. 10-2022-0083008

(51) Int. Cl.
  *G11C 16/08*   (2006.01)
  *G11C 16/16*   (2006.01)
  *G11C 16/24*   (2006.01)
  *G11C 16/30*   (2006.01)

(52) U.S. Cl.
  CPC .............. *G11C 16/08* (2013.01); *G11C 16/16* (2013.01); *G11C 16/24* (2013.01); *G11C 16/30* (2013.01)

(58) Field of Classification Search
  CPC ....................................................... G11C 16/08
  See application file for complete search history.

(56) References Cited

U.S. PATENT DOCUMENTS

| | | | | |
|---|---|---|---|---|
| 10,984,872 | B1* | 4/2021 | Jin | G11C 16/10 |
| 2010/0302851 | A1* | 12/2010 | Ryu | G11C 16/12 |
| | | | | 365/185.23 |
| 2015/0340096 | A1* | 11/2015 | Shim | G11C 5/063 |
| | | | | 365/185.11 |
| 2020/0357474 | A1* | 11/2020 | Yun | H10B 43/40 |

FOREIGN PATENT DOCUMENTS

KR    1020190142550 A    12/2019

OTHER PUBLICATIONS

Jae-Woo Park et al., 30.1 A 176-Stacked 512Gb 3b/Cell 3D-NAND Flash with 10.8Gb/mm2 Density with a Peripheral Circuit Under Cell Array Architecture, 2021 IEEE International Solid-State Circuits Conference (ISSCC), ISSCC 2021 / Session 30 / Non-Volatile Memories / 30.1, pp. 422-423, Feb. 18, 2021.
Jun Hyoung Kim et al., Highly Manufacturable 7th Generation 3D NAND Flash Memory with COP structure and Double Stack Process, IEEE, 2021 Symposium on VLSI Technology Digest of Technical Papers.

* cited by examiner

*Primary Examiner* — Douglas King
(74) *Attorney, Agent, or Firm* — WILLIAM PARK AND ASSOCIATES LTD.

(57) ABSTRACT

A memory device, and an operating method of the memory device, includes a voltage generator for generating operating voltages and a row decoder for transmitting the operating voltages to a memory block through local lines. The memory device also includes page buffers connected to the memory block through bit lines, the page buffers applying voltages to (Continued)

the bit lines in response to page buffer control signals. The memory device further includes a page buffer control circuit for outputting the page buffer control signals by adjusting levels of the voltages and times at which the voltages are applied to the bit lines according to distances of the bit lines from the row decoder.

15 Claims, 20 Drawing Sheets

MEMORY DEVICE AND OPERATING METHOD OF THE MEMORY DEVICE

CROSS-REFERENCE TO RELATED APPLICATION

The present application claims priority under 35 U.S.C. § 119(a) to Korean patent application number 10-2022-0083008, filed on Jul. 6, 2022, in the Korean Intellectual Property Office, the entire disclosure of which is incorporated herein by reference.

BACKGROUND

1. Technical Field

The present disclosure generally relates to a memory device and an operating method of the memory device, and more particularly, to a memory device configured to perform a program, read, or erase operation and an operating method of the memory device.

2. Related Art

A memory device may include a memory cell array in which data is stored, a peripheral circuit configured to program or read data in the memory cell array or to erase data in the memory cell array, and a control circuit configured to control the peripheral circuit.

The memory cell array may include a plurality of planes. Each of the plurality of planes may include a plurality of memory blocks, and each of the plurality of memory blocks may include a plurality of memory cells.

The peripheral circuit may be configured to perform a program, read, or erase operation of a selected memory block among the memory blocks included in the memory device under the control of the control circuit.

The control circuit may be configured to control the peripheral circuit in response to a command and an address, which are output from an external controller. For example, the control circuit may control the peripheral circuit to perform a program operation in a selected memory block in response to a program command and an address, control the peripheral circuit to perform a read operation of a selected memory block in response to a read command and an address, or control the peripheral circuit to erase a selected memory block in response to an erase command and an address.

The peripheral circuit may be connected to the memory cell array through bit lines and local lines, and perform a program, read, or erase operation by adjusting voltages applied to the bit lines and the local lines.

When the degree of integration of the memory device increases, the number of memory cells included in the memory cell array increases. Therefore, the number or length of bit lines and local lines, which connect the memory cells and the peripheral circuit to each other, also increases. When the number or length of physical structures constituting the memory device increases as described above, an electric delay may occur in a program, read, or erase operation. Due to the electric delay, the time required to perform a program, read, or erase operation in the memory device may increase, and the reliability of the memory device may deteriorate.

SUMMARY

Some embodiments provide a memory device capable of adjusting voltages applied to bit lines according to distances between a row decoder included in a peripheral circuit and the bit lines, and an operating method of the memory device.

In accordance with an aspect of the present disclosure, there is provided a memory device including: a voltage generator configured to generate operating voltages; a row decoder configured to transmit the operating voltages to a memory block through local lines; page buffers connected to the memory block through bit lines, the page buffers being configured to apply voltages to the bit lines in response to page buffer control signals; and a page buffer control circuit configured to output the page buffer control signals by adjusting levels of the voltages and times at which the voltages are applied to the bit lines according to distances of the bit lines from the row decoder.

In accordance with another aspect of the present disclosure, there is provided a method of operating a memory device, the method including: applying an erase allow voltage to word lines; applying an erase voltage to bit lines; and applying a turn-on voltage to a first select line between the word lines and the bit lines, wherein, as distances of the bit lines from a row decoder become closer, an increasing speed of the erase voltage applied to the bit lines becomes relatively lower, wherein the row decoder applies the erase allow voltage to the word lines and applies the turn-on voltage to the first select line.

In accordance with still another aspect of the present disclosure, there is provided a method of operating a memory device, the method including: applying a read voltage to a selected word line among word lines; applying a pass voltage to unselected word lines among the word lines; applying a precharge voltage to bit lines; and applying a turn-on voltage to a first select line between the word lines and the bit lines, wherein levels of the precharge voltage applied to the bit lines become lower as distances of the bit lines from a row decoder become closer, wherein the row decoder applies the read voltage and the pass voltage to the word lines and applies the turn-on voltage to the first select line.

In accordance with still another aspect of the present disclosure, there is provided a method of operating a memory device, the method including: applying a program voltage to a selected word line among word lines; applying a pass voltage to unselected word lines among the word lines; applying a program allow voltage to selected bit lines among bit lines; applying a program inhibit voltage to unselected bit lines among the bit lines; and applying a turn-on voltage to a first select line between the word lines and the bit lines, wherein the program allow voltage becomes lower and the program inhibit voltage becomes higher, as distances of the bit lines from a row decoder become closer, wherein the row decoder applies the program voltage and the pass voltage to the word lines and applies the turn-on voltage to the first select line.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be enabling to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural and functional descriptions disclosed herein are merely illustrative for the purpose of describing embodiments according to the concept of the present disclosure. Additional embodiments according to the concept of the present disclosure can be implemented in various forms. Thus, the present disclosure should not be construed as limited to the embodiments set forth herein.

Hereinafter, it will be understood that, although the terms "first," "second," etc. may be used herein to describe various elements, these elements should not be limited by these terms. These terms are only used to distinguish one element from another element.

Figure 1:
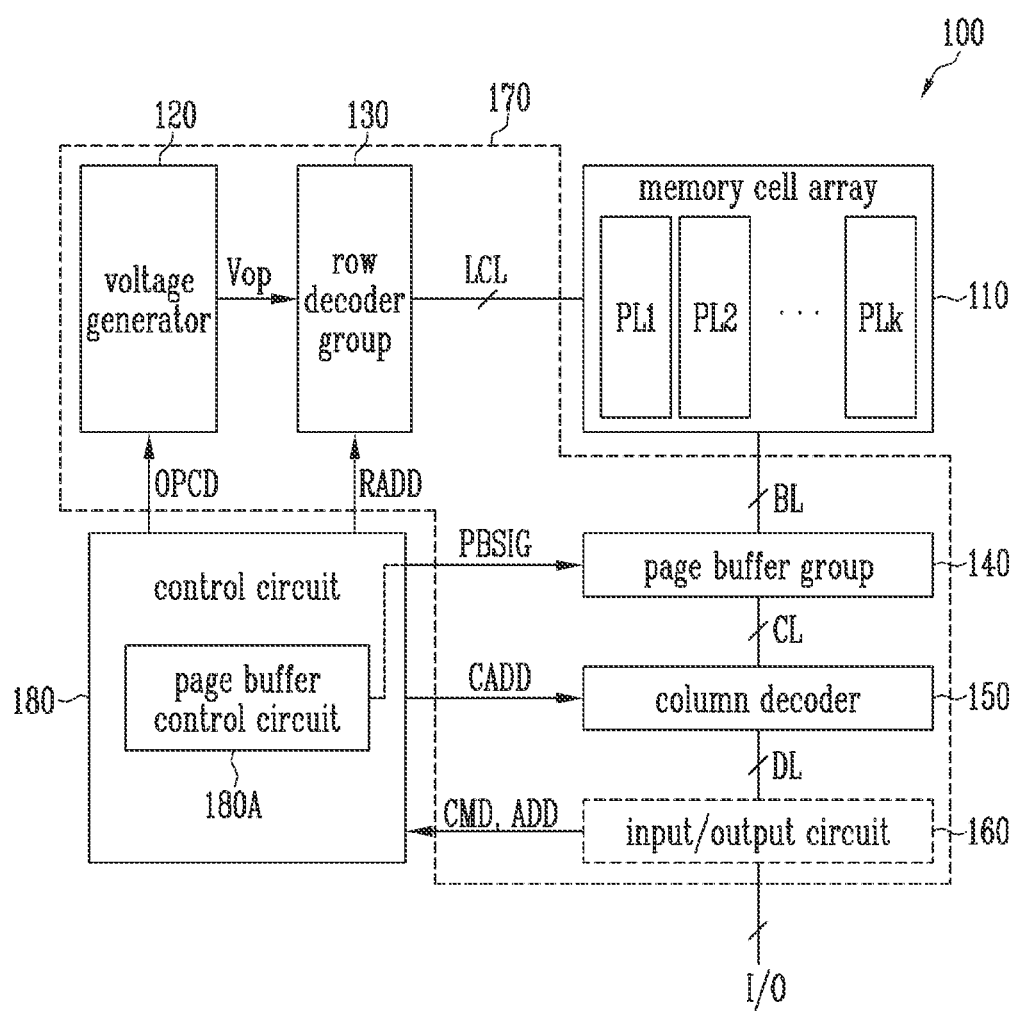
FIG. 1 is a diagram illustrating a memory device.

FIG. 1 is a diagram illustrating a memory device.

Referring to FIG. 1, the memory device 100 may include a memory cell array 110, a peripheral circuit 170, and a control circuit 180.

The memory cell array 110 may include at least one plane. For example, the memory cell array 110 may include first to kth planes PL1 to PLk. Each of the first to kth planes PL1 to PLk may include memory blocks, and each of the memory blocks may include memory cells. The memory blocks may be formed in a two-dimensional structure or a three-dimensional structure. The memory blocks having the two-dimensional structure may include memory cells arranged in parallel to a substrate. The memory blocks having the three-dimensional structure may include memory cells stacked in a vertical direction above a substrate. In this embodiment, the memory blocks formed in the three-dimensional structure are described. The memory cells may one-bit or two-or-more-bit data according to a program mode. For example, a mode in which one-bit data is stored in one memory cell is referred to as a single-level cell mode, and a mode in which two-bit data is stored in one memory cells is referred to as a multi-level cell mode. A mode in which three-bit data is stored in one memory cell is referred to as a triple-level cell mode, and a mode in which four-bit data is stored in one memory cell is referred to as a quad level cell mode. In addition, five-or-more-bit data may be stored in one memory cell.

The peripheral circuit 170 may be configured to perform a program operation for storing data, a read operation for outputting data stored in the memory cell array 110, and an erase operation for erasing data stored in the memory cell array 110. For example, the peripheral circuit 170 may include a voltage generator 120, a row decoder group 130, a page buffer group 140, a column decoder 150, and an input/output circuit 160.

The voltage generator 120 may generate various operating voltages Vop used for a program operation, a read operation, or an erase operation in response to an operation code OPCD. For example, the voltage generator 120 is configured to generate a program voltage, a pass voltage, a turn-on voltage, a turn-off voltage, a ground voltage, a verify voltage, a read voltage, an erase voltage, and the like, in response to the operation code OPCD. The program voltage is a voltage applied to a selected word line in a program operation, and may be used to increase a threshold voltage of memory cells. The pass voltage is a voltage applied to unselected word lines in a program or read operation, and may be used to turn on unselected memory cells. The turn-on voltage is a voltage applied to a drain select line or a source select line, and may be used to turn on a drain select transistor or a source select transistor. The turn-off voltage is a voltage applied to the drain select line or the source select line, and may be used to turn off the drain select transistor or the source select transistor. The ground voltage may be a voltage of 0V. The verify voltage is a voltage for determining a threshold voltage of selected memory cells in a program or erase operation, and may be applied to all word lines connected to a selected word line or a selected memory block. The read voltage is a voltage applied to a selected word line in a read operation, and may be used to determine data stored in memory cells. The erase voltage is a voltage applied to a source line in an erase operation, and may be used to decrease a threshold voltage of memory cells.

The row decoder group 130 may be configured to transmit the operating voltages Vop to local lines LCL connected to a selected memory block, according to a row address RADD. For example, the row decoder group 130 may be connected to the voltage generator 120 through global lines, and be connected to the first to kth planes PL1 to PLk through the local lines LCL. The row decoder group 130 may include row decoders (not shown) respectively connected to the first to kth planes PL1 to PLk. Each of the row decoders (not shown) may be connected to the memory blocks included in the first to kth planes PL1 to PLk through the local lines LCL. The local lines LCL may include a drain select line, word lines, a source select line, and a source line.

The page buffer group 140 may include page buffers, and the page buffers may be connected to the memory cell array 110 through bit lines BL. The page buffers may adjust levels of a voltage applied to the bit lines BL and times at which the voltage is applied to the bit lines BL in response to page buffer control signals PBSIG. For example, in an erase operation, the page buffers may adjust times at which an erase voltage is applied to the bit lines BL according to distances between a row decoder included in the row decoder group 130 and the bit lines BL. In a read operation, the page buffers may adjust levels of a precharge voltage applied to the bit lines BL according to distances between the row decoder group 130 and the bit lines BL. In a program operation, the page buffers may adjust levels of a program allow voltage or a program inhibit voltage, which is applied to the bit lines BL, according to the distances between the row decoder group 130 and the bit lines BL.

The column decoder 150 may be configured to transmit data between the page buffer group 140 and the input/output circuit 160 in response to a column address CADD. For example, the column decoder 150 may be connected to the page buffer group 140 through column lines CL, and be connected to the input/output circuit 160 through data lines DL.

The input/output circuit 160 may transfer a command CMD and an address ADD, which are transferred from external device (e.g., a controller), to the control circuit 180. In a program operation, the input/output circuit 160 may transmit data transferred from the external device to the column decoder 150. In a read operation, the input/output circuit 160 may output data received from the column decoder 150 to the external device.

The control circuit 180 may output the operation code OPCD, the row address RADD, the page buffer control signals PBSIG, and the column address CADD in response to the command CMD and the address ADD. For example, when the command CMD input to the control circuit 180 is an erase command, the control circuit 180 may control the peripheral circuit 170 to perform an erase operation of a memory block selected by the address ADD. When the command CMD input to the control circuit 180 is a read command, the control circuit 180 may control the peripheral circuit to perform a read operation of a memory block selected by an address and to output read data. When the command CMD input to the control circuit 180 is a program command, the control circuit 180 may control the peripheral circuit 170 to perform a program operation of a selected memory block.

The memory device 100 in accordance with this embodiment may include a page buffer control circuit 180A for controlling the page buffer group 140 to compensate for an electric delay which may occur in an erase, read, or program operation as the number of bit lines BL increases.

The page buffer control circuit 180A may vary page buffer control signals PBSIG for adjusting levels of a voltage applied to the bit lines BL or times at which the voltage is applied to the bit lines BL in response to the command CMD. The page buffer control signals PBSIG may include voltages applied to the bit lines BL but also various signals for adjusting circuits included in the page buffers.

In an erase operation, the page buffer control circuit 180A may adjust the page buffer control signals PBSIG such that an erase voltage is applied. In particular, the page buffer control circuit 180A may adjust the page buffer control signals PBSIG such that times at which the erase voltage is applied to the bit lines BL become later as the distances between the row decoder group 130 and the bit lines BL increase.

In a read operation, the page buffer control circuit 180A may adjust the page buffer signals PBSIG such that a precharge voltage is applied to the bit lines BL. In particular, the page buffer control circuit 180A may adjust the page buffer control signals PBSIG such that levels of the precharge voltage applied to the bit lines BL become higher as the distances between the row decoder group 130 and the bit lines BL increase.

In a program operation, the page buffer control circuit 180A may adjust the page buffer control signals PBSIG such that a program allow voltage is applied to selected bit lines among the bit lines BL and a program inhibit voltage is applied to unselected bit lines among the bit lines BL. In particular, the page buffer control circuit 180A may adjust the page buffer control signals PBSIG such that levels of the program allow voltage applied to the bit lines BL become lower and levels of the program inhibit voltage applied to the bit lines BL become higher as the distances between the row decoder group 130 and the bit lines BL increase.

Figure 2A:
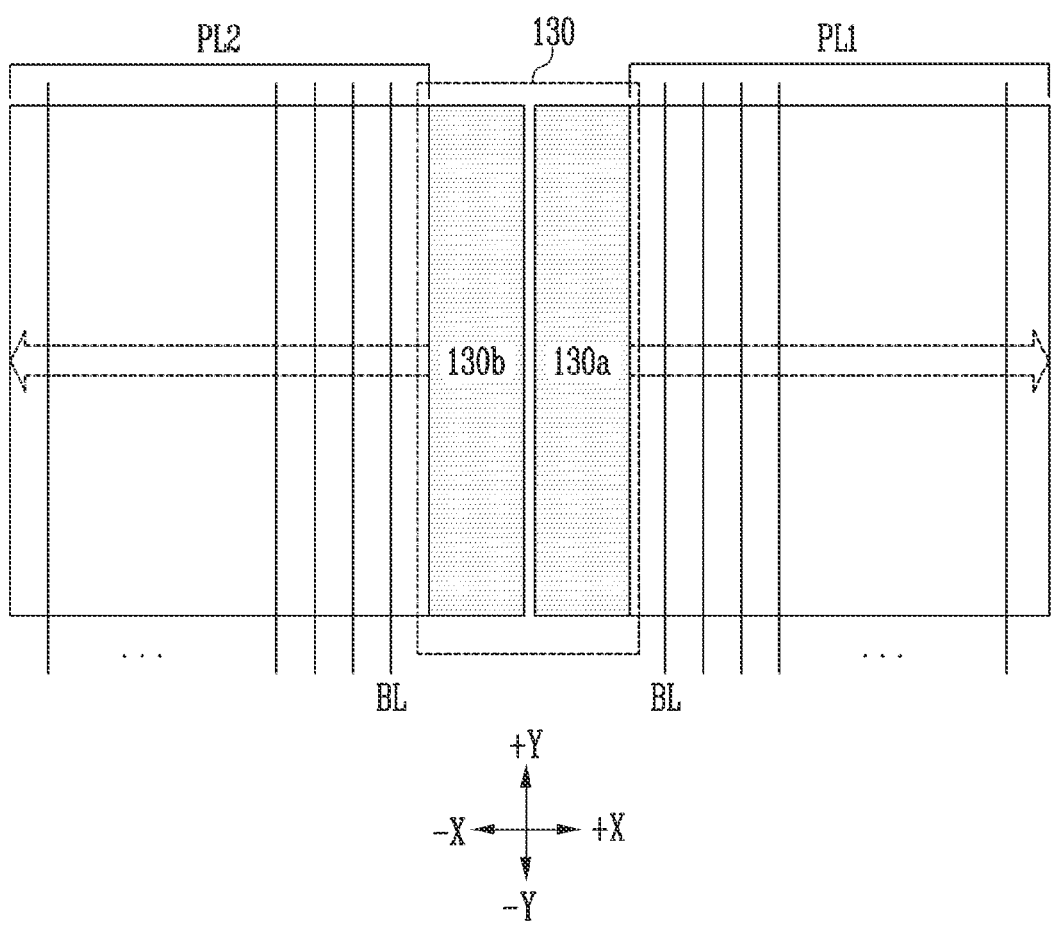
FIGS. 2A to 2C are diagrams illustrating a connection configuration of row decoders and planes.
Figure 2B:
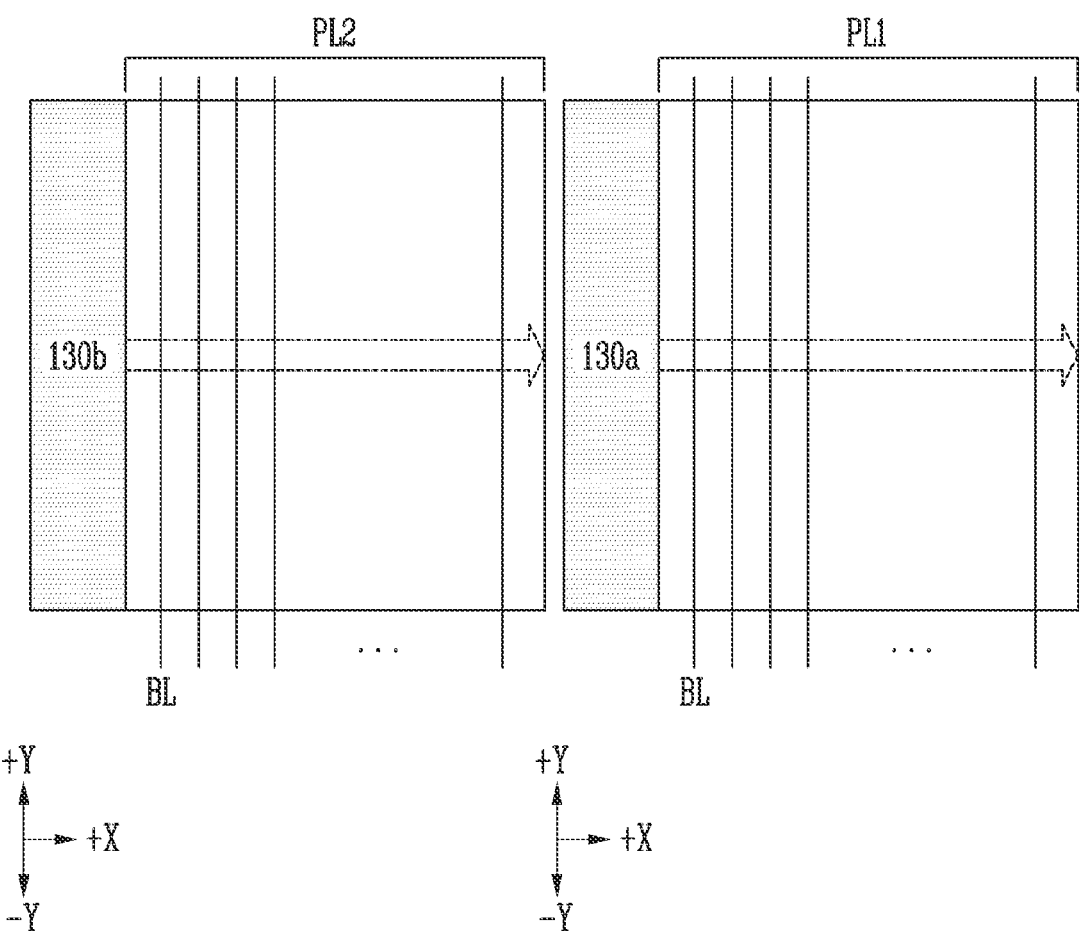
Figure 2C:
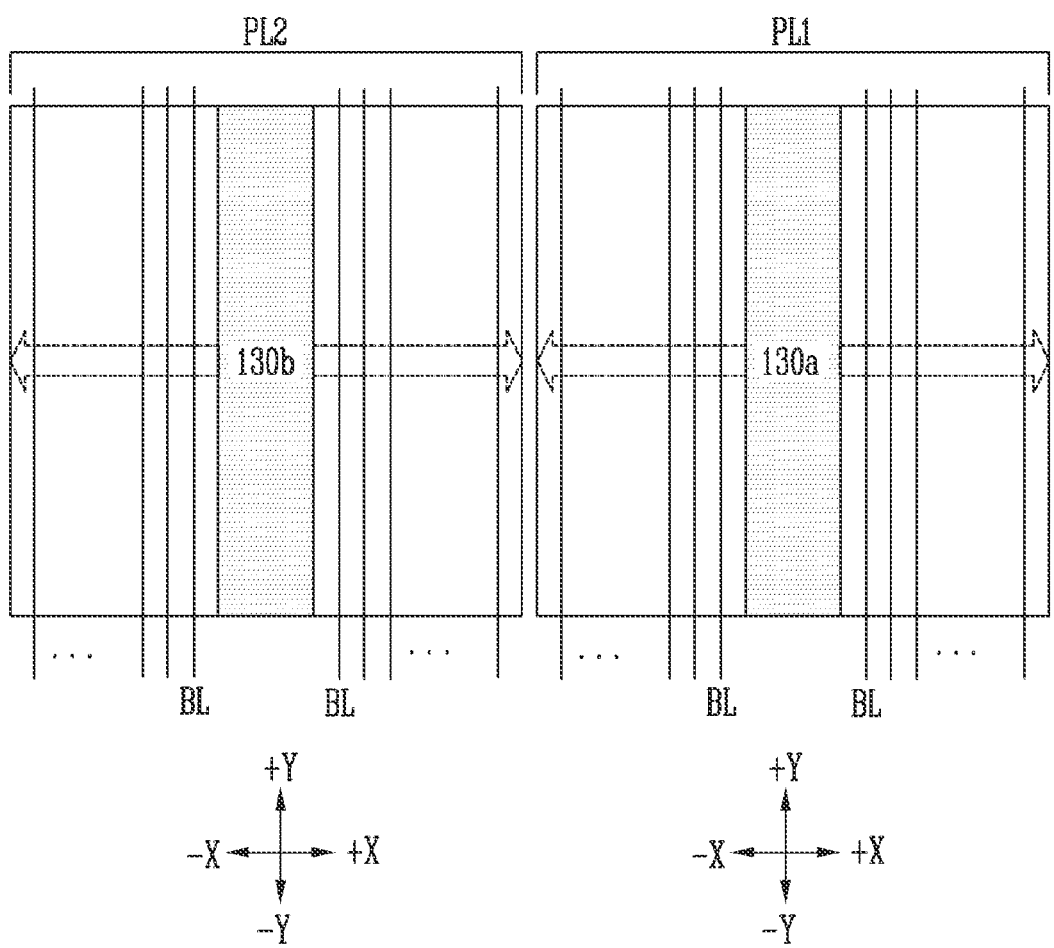

FIGS. 2A to 2C are diagrams illustrating a connection configuration of row decoders and planes.

FIGS. 2A to 2C illustrate, as an embodiment, a configuration in which first and second row decoders 130a and 130b are connected to first and second planes PL1 and PL2.

Referring to FIG. 2A, the first row decoder 130a may be connected to the first plane PL1, and the second row decoder 130b may be connected to the second plane PL2. The first and second row decoders 130a and 130b may be disposed between the first and second planes PL1 and PL2. When the first row decoder 130a is adjacent in a +X direction from the second row decoder 130b, the first plane PL1 may be arranged in the +X direction from the first row decoder 130a, and the second plane PL2 may be arranged in a −X direction from the second row decoder 130b. Bit lines BL which extend along ±Y directions and are spaced apart from each other along the +X or −X direction may be connected to the first and second planes PL1 and PL2. The ±Y directions are orthogonal to the +X and −X directions. Distances between bit lines BL connected to the first plane PL1 and the first row decoder 130a become more distant along the +X direction, and distances between bit lines BL connected to the second plane PL2 and the second row decoder 130b become more distant along the −X direction.

Referring to FIG. 2B, the first plane PL1 may be arranged along the +X direction from the first row decoder 130a, and the second plane PL2 may be arranged along the +X direction from the second row decoder 130b. Therefore, the second plane PL2 may be arranged between the first and second row decoders 130a and 130b. The first plane PL1 may be connected to the first row decoder 130a, and the second plane PL2 may be connected to the second row decoder 130b. Bit lines which extend along the ±Y directions and are spaced apart from each other along the +X direction may be connected to the first and second planes PL1 and PL2. The ±Y directions are orthogonal to the +X direction. Distances between bit lines BL connected to the first plane PL1 and the first row decoder 130a become more distant along the +X direction, and distances between bit lines BL connected to the second plane PL2 and the second row decoder 130b become more distant along the +X direction.

Referring to FIG. 2C, the first and second planes PL1 and PL2 may be adjacent to each other, and each of the first and second row decoders 130a and 130b may be disposed in the middle of the first or second plane PL1 or PL2. For example, the first row decoder 130a may be disposed in the middle of the first plane PL1, and the second row decoder 130b may be disposed in the middle of the second plane PL2. Therefore, some of bit lines BL connected to the first plane PL1 may arranged along the +X direction from the first row decoder 130a, and the others of the bit lines BL connected to the first plane PL1 may be arranged along the −X direction from the first row decoder 130a. Some of bit lines BL connected to the second plane PL2 may arranged along the +X direction from the second row decoder 130b, and the others of the bit lines BL connected to the second plane PL2 may be arranged along the −X direction from the second row decoder 130b.

In addition to the connection configurations shown in FIGS. 2A to 2C, the first and second planes PL1 and PL2 and the first and second row decoders 130a and 130b may be variously arranged.

Figure 3:
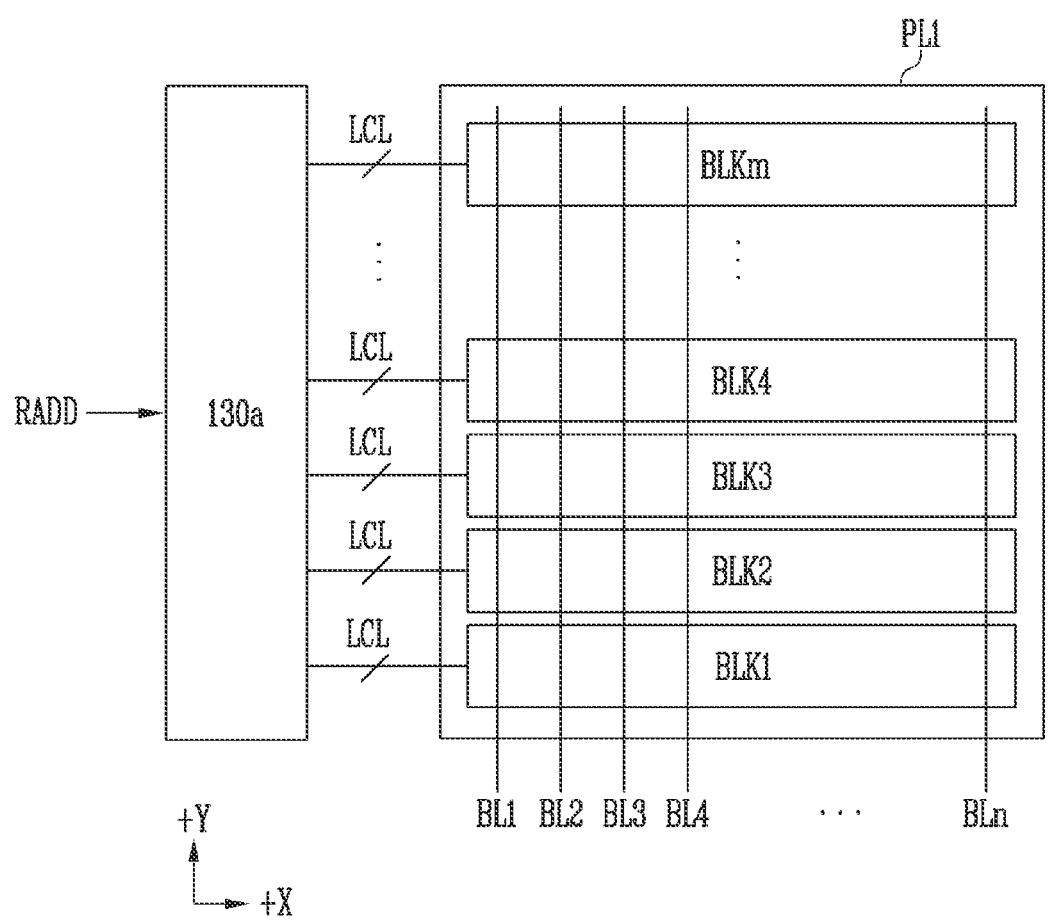
FIG. 3 is a diagram illustrating a connection configuration of memory blocks included in a plane.

FIG. 3 is a diagram illustrating a connection configuration of memory blocks included in a plane, and first to mth memory blocks BLK1 to BLKm included in the first plane PL1 are illustrated as an example.

Referring to FIG. 3, the first to mth memory blocks BLK1 to BLKm may be arranged to be spaced apart from each other along the +Y direction. First to nth bit lines BL1 to BLn commonly connected to the first to mth memory blocks BLK1 to BLKm may extend along the +Y direction, and be arranged to be spaced apart from each other along the +X direction. Each of the first to mth memory blocks BLK1 to BLKm may be connected to the first row decoder 130a through local lines LCL. The first row decoder 130a may transmit operating voltages through local lines LCL connected to a selected memory block among the first to mth memory blocks BLK1 to BLKm in response to a row address RADD. While a program, read or erase operation is performed in the selected memory block, the first row decoder 130a may float local lines LCL connected to unselected memory blocks. The local lines LCL may include a drain select line, word lines, a source select line, and a source line, and may additionally include dummy lines.

Figure 4:
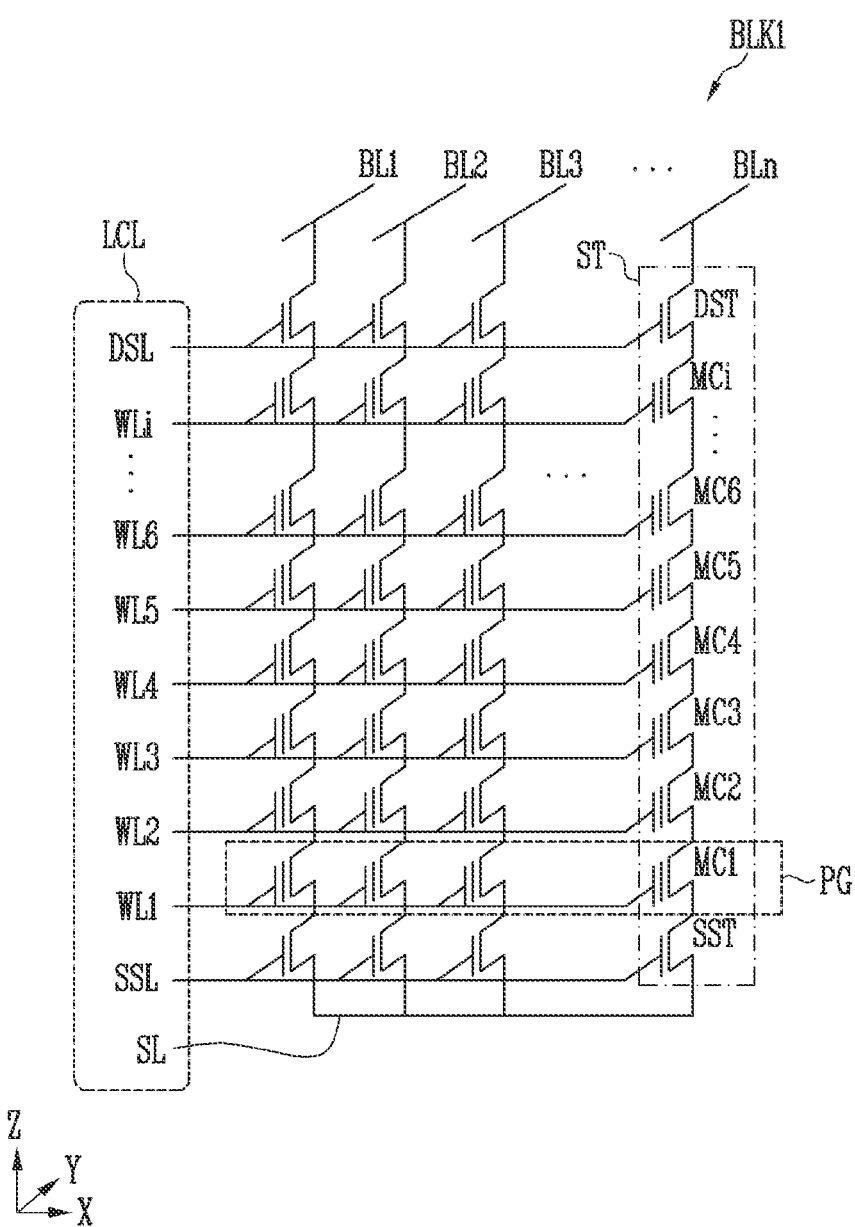
FIG. 4 is a diagram illustrating a memory block.

FIG. 4 is a diagram illustrating a memory block.

Referring to FIG. 4, a first memory block BLK1 includes strings ST connected between first to nth bit lines BL1 to BLn and a source line SL. Since the first to nth bit lines BL1 to BLn extend along a Y direction and are arranged to be spaced apart from each other along an X direction, the strings ST may extend along a Z direction and be arranged to be spaced apart from each other along the X and Y directions.

Any one string ST among strings ST connected to the nth bit line BLn will be described as an example. The string ST may include a source select transistor SST, first to ith memory cells MC1 to MCi, and a drain select transistor DST. The first memory block BLK1 shown in FIG. 4 is a drawing schematically illustrating a structure of a memory block, and therefore, numbers of source select transistor SST, first to ith memory cells MC1 to MCi, and drain select transistors DST, which are included in the strings ST, may be changed according to a memory device.

Gates of source select transistors SST included in different strings ST may be connected to a source select line SSL, gates of first to ith memory cells MC1 to MCi included in the different strings ST may be connected to first to ith word lines WL1 to WLi, and gates of drain select transistors DST included in the different strings ST may be connected to a drain select line DSL. The drain select line DSL, the first to ith word lines WL1 to WLi, the source select line SSL, and the source line SL may be included in local lines LCL.

Memory cells formed in the same layer among the first to ith memory cells MC1 to MCi may be connected to the same word line. For example, first memory cells MC1 included in different strings ST may be commonly connected to the first word line WL1, and ith memory cells MCi included in the different strings ST may be commonly connected to the ith word line WLi. A group of memory cells which are included in different strings ST and are connected to the same word line becomes a page PG. Program and read operations may be performed in units of pages PG, and an erase operation may be performed in units of memory blocks. An operation performed in units of memory blocks may be performed in all pages included in a selected memory block.

Figure 5:
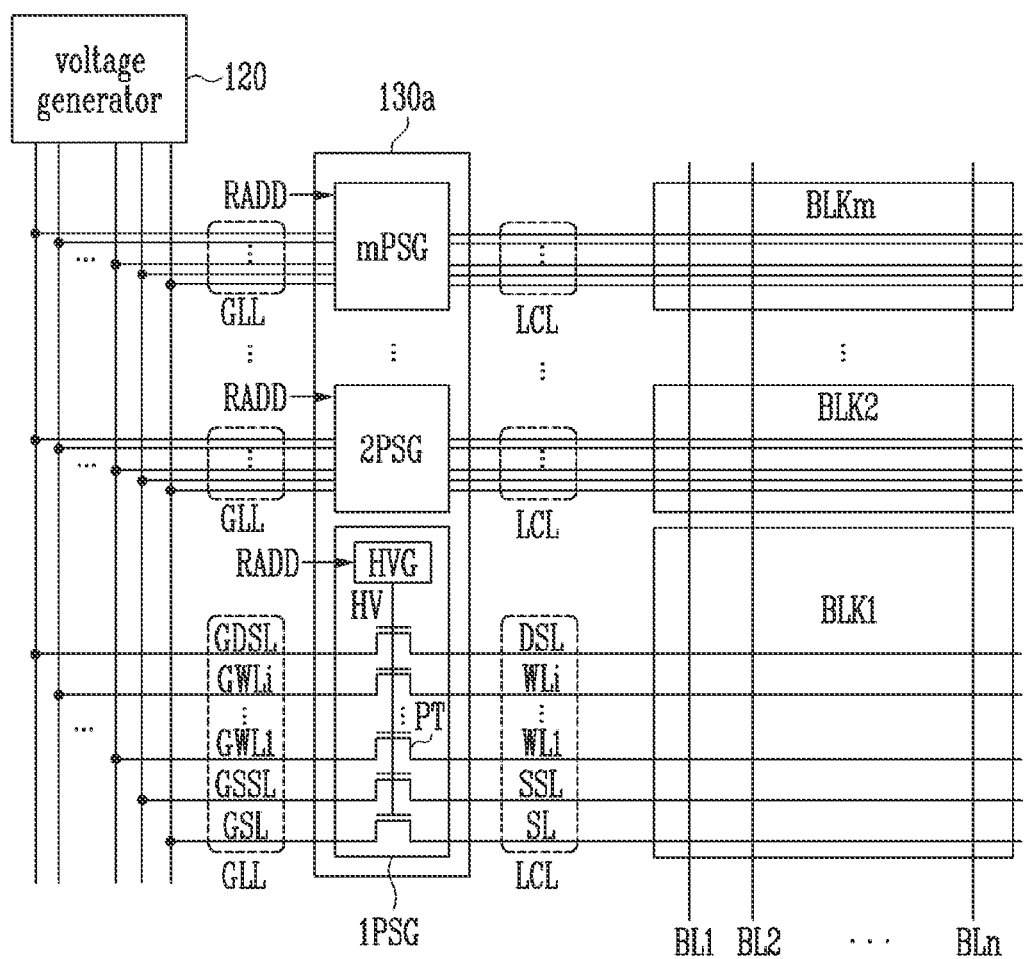
FIG. 5 is a diagram illustrating a row decoder.

FIG. 5 is a diagram illustrating a row decoder.

Referring to FIG. 5, the first row decoder 130a is illustrated as an embodiment.

The first row decoder 130a may include first to mth pass switch groups 1PSG to mPSG connected to first to mth memory blocks BLK1 to BLKm. The first to mth pass switch groups 1PSG to mPSG may be connected to the first to mth memory blocks BLK1 to BLKm through local lines LCL, and be connected to the voltage generator 120 through global lines GLL. For example, operating voltages generated by the voltage generator 120 may be output through the global lines GLL, and the first to mth pass switch groups 1PSG to mPSG may commonly receive the operating voltages output through the global lines GLL. The first to mth pass switch groups 1PSG to mPSG may be activated or inactivated in response to a row address RADD. For example, when the first pass switch group 1PSG is selected according to the row address RADD, the first pass switch group 1PSG may be activated, and the other second to mth pass switch groups 2PSG to mPSG may be inactivated. When the first pass switch group 1PSG is activated, the first pass switch group 1PSG may connect the global lines GLL and the local lines LCL to each other. The inactivated second to mth pass switch groups 2PSG to mPSG may block the global lines GLL and the local lines LCL from each other. The first to mth pass switch groups 1PSG to mPSG are configured identically to one another, and therefore, the first pass switch group 1PSG will be described as an example.

The first pass switch group 1PSG may include pass transistors PT connected between the global lines GLL and the local lines LCL and a high voltage generator HVG configured to turn on or turn off the pass transistors PT. Since the pass transistors PT is to transmit operating voltages having various levels, the pass transistors PT may be configured as transistors having a breakdown voltage higher than breakdown voltages of ordinary transistors turned on by a power voltage.

The high voltage generator HVG may decode a row address RADD, and output a high voltage signal HV according to a result obtained by decoding the row address RADD. For example, when the first pass switch group 1PSG is selected, the high voltage generator HVG of the first pass switch group 1PSG may generate a high voltage signal HV, and output the high voltage signal HV through gates of the pass transistors PT. The pass transistors PT may be simultaneously turned on in response to the high voltage signal HV. High voltage generators HVG of the unselected second to mth pass switch groups 2PSG to mPSG do not output the high voltage signal HV according to the result obtained by decoding the row address RADD, and therefore, operating voltages applied to the global lines GLL may be supplied to the first memory block through the first pass switch group 1PSG and the local lines LCL.

That is, since the operating voltages applied to the first memory block BLK1 through the local lines LCL are supplied from the first row decoder 130a, a difference in speed at which the operating voltages are loaded may occur according to distances from the first row decoder 130a. For example, a distance of a string connected to the first bit line BL1 among strings included in the first memory block BLK1 from the first row decoder 130a is closest, a distance of a string connected to the nth bit line BLn among the strings included in the first memory block BLK1 from the first row decoder 130a is most distant. Therefore, at the same time, a voltage transferred to the string connected to the nth bit line BLn may be lower than a voltage transferred to the string connected to the first bit line BL1.

As described above, when a difference in voltage applied to memory cells occurs according to distances from the row decoder, the reliability of an operation performed in a memory block may be deteriorated. Thus, in this embodiment, levels of a voltage applied to the first to nth bit lines BL1 to BLn or times at which the voltage is applied can be adjusted according to the distances from the row decoder to compensate for a difference between operating voltages applied to the local lines LCL.

Figure 6:
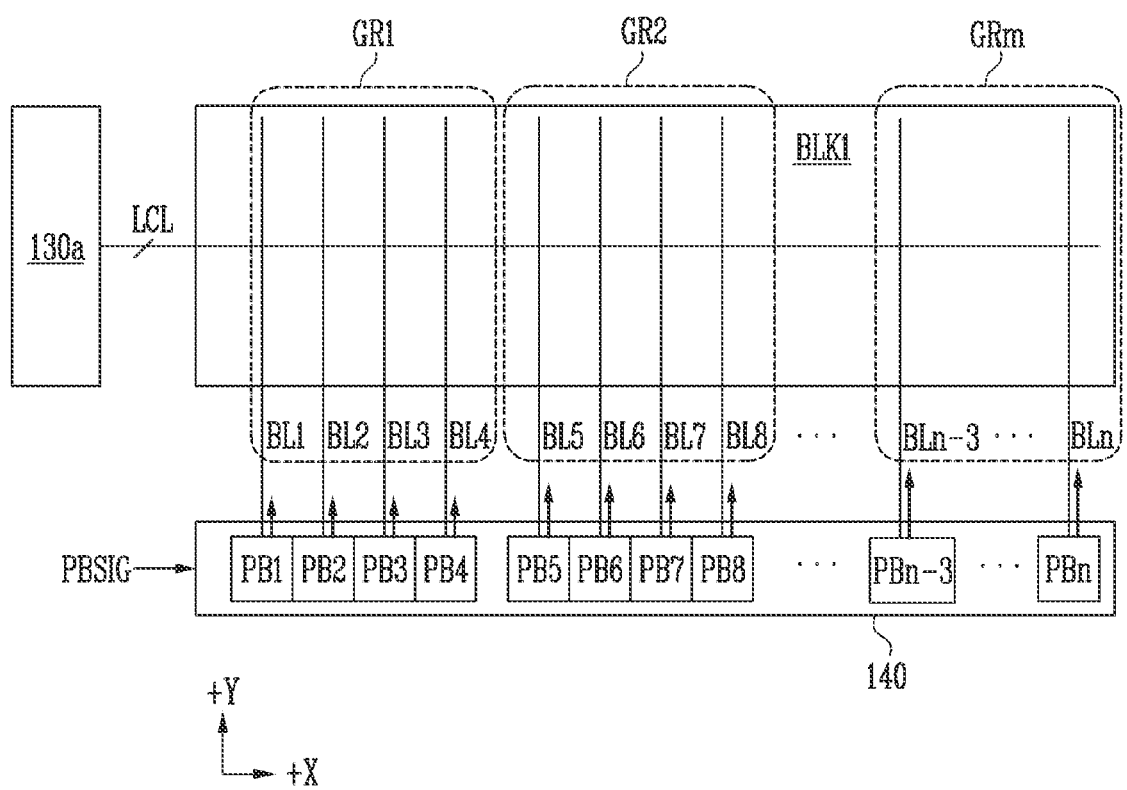
FIG. 6 is a diagram illustrating a voltage adjusting method of bit lines in accordance with an embodiment of the present disclosure.

FIG. 6 is a diagram illustrating a voltage adjusting method of bit lines in accordance with an embodiment of the present disclosure.

Referring to FIG. 6, the first to nth bit lines BL1 to BLn may be connected to the page buffer group 140, and the page buffer group 140 may include first to nth page buffers PB1 to PBn respectively connected to the first to nth bit line BL1 to BLn. The first to nth bit lines BL1 to BLn may be grouped into first to mth bit line groups GR1 to GRm according to distances from the first row decoder 130a. Although a case where four bit lines are included in each of the first to mth bit line groups GR1 to GRm is illustrated in FIG. 6, the number of bit lines included in each group may be changed according to a memory device. In this embodiment, the first to mth bit line groups GR1 to GRm may be defined in an order in which the first to mth bit line groups GR1 to GRm are close to the first row decoder 130a. For example, a distance between the first bit line group GR1 among the first to mth bit line groups GR1 to GRm and the first row decoder 130a is shortest, and a distance between the mth bit line group GRm among the first to mth bit line groups GR1 to GRm and the first row decoder 130a is longest. Therefore, the first bit line group GR1 may include first to fourth bit lines BL1 to BL4, and the second bit line group GR2 may include fifth to eighth bit lines BL5 to BL8. In this manner, the third to mth bit line groups GR3 to GRm may be defined.

When operating voltages are applied to local lines LCL, the operating voltages may be applied earliest to the first bit line group GR1 of which distance from the first row decoder 130a is shortest, and be applied latest to the mth bit line group GRm of which distance from the first row decoder 130a is longest.

In order to ensure the reliability of operations performed in the memory device, times at which operating voltages are applied to the local lines LCL may be increased such that the operating voltage applied to the local lines LCL are sufficiently increased to a target level regardless of the distances from the first row decoder 130a. However, a time required to perform an operation increases, and therefore, the performance of the memory device may be deteriorated.

Accordingly, in this embodiment, a voltage applied to the first to mth bit lines group GR1 to GRm is adjusted, so that deterioration of the reliability due to different operating voltage according to the distances from the first row decoder 130a can be prevented.

A voltage applied to the first to nth bit lines BL1 to BLn of the first to mth bit line group GR1 to GRm is determined by the first to nth page buffers PB1 to PBn. Therefore, a technique for differently controlling the first to nth page buffers PB1 to PBm according to the first to mth bit line groups GR1 to GRm is disclosed in this embodiment.

Figure 7:
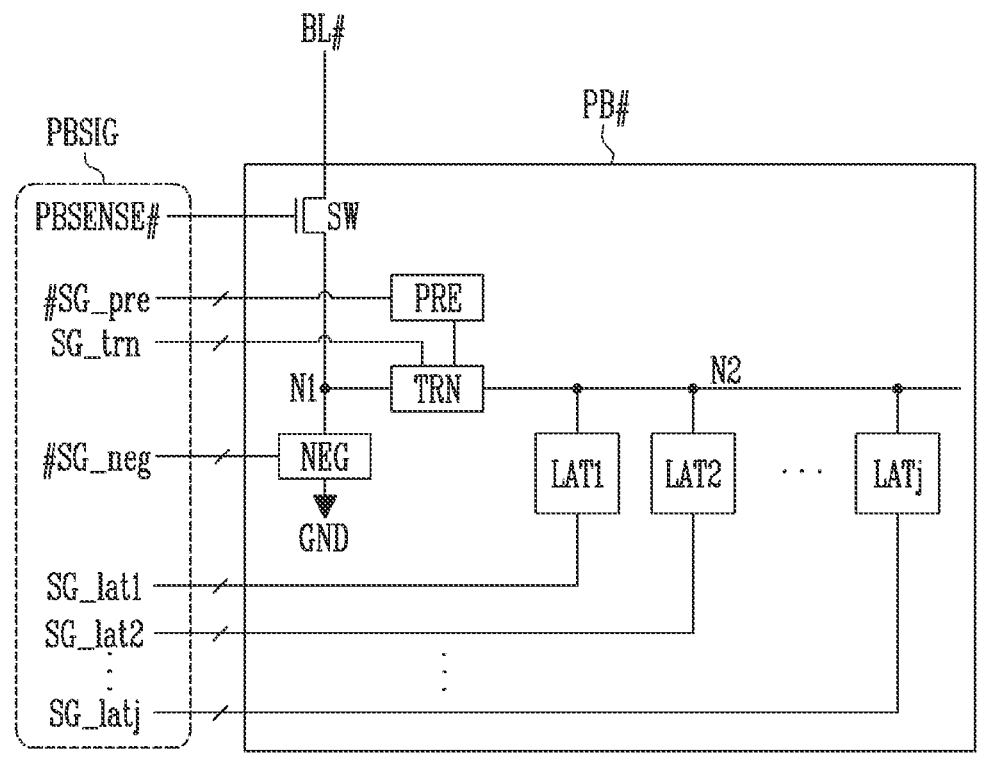
FIG. 7 is a diagram illustrating a page buffer.

FIG. 7 is a diagram illustrating a page buffer.

Referring to FIGS. 6 and 7, the first to nth page buffers PB1 to PBn are configured identically to one another, and therefore, any one page buffer PB# among the first to nth page buffers PB1 to PBn will be described as an example.

The page buffer PB# may include a switch SW configured to electrically connect or block a bit line BL# and a first node N1 to or from each other, a precharge circuit PRE, a transmission circuit TRN, first to jth latches LAT1 to LATj, and a negative circuit NEG.

The switch SW may be implemented as an NMOS transistor connected between the bit line BL# and the first node N1. The switch SW may be turned on in response to a sensing signal PBSENSE# applied to a gate thereof, and be turned off when a voltage of the gate is 0V. A turn-on level of the switch SW may be adjusted according to a voltage level of the sensing signal PBSENSE #. For example, the sensing signal PBSENSE# may be set to a positive voltage to turn on the switch SW. As the voltage level of the sensing signal PBSENSE# becomes higher, the turn-on level of the switch SW may become higher.

The sensing signal PBSENSE# may vary according to the first to mth bit line groups GR1 to GRm. A time at which the sensing signal PBSENSE# is applied to the switch SW or the voltage level of the sensing signal PBSENSE# may be adjusted according to the first to mth bit line groups GR1 to GRm. For example, the same sensing signal PBSENSE# may be applied to first to fourth page buffers PB1 to PB4 included in the first bit line group GR1 at the same time. The times at which the sensing signal PBSENSE# is applied to the first to fourth page buffers PB1 to PB4 may be different from times at which a sensing signal PBSENSE# is applied to fifth to eighth page buffers PB5 to PB8. Voltage levels of the sensing signal PBSENSE# applied to the first to fourth page buffers PB1 to PB4 may be different from voltage levels of the sensing signal PBSENSE# applied to the fifth to eighth page buffers PB5 to PB8. In this manner, different sensing signal PBSENSE# may be applied to page buffers corresponding to the first to mth bit line groups GR1 to GRm.

The precharge circuit PRE may be configured to generate a precharge voltage or an erase voltage, which is used to precharge the bit line BL# in response to a precharge signal #SG_pre. Each of the precharge voltage and the erase voltage may be a positive voltage, and be transmitted to the transmission circuit TRN. The precharge signal #SG_pre may vary according to the first to mth bit line groups GR1 to GRm. For example, a level of the precharge voltage generated by the precharge circuit PRE may be changed according to the precharge signal #SG_pre.

The transmission circuit TRN may be configured to electrically connect or block the first node N1 and a second node N2 to or from each other in response to a transmission signal SG_trn. The first to jth latches LAT1 to LATj may be configured to temporarily store data in a program or read operation. The first to jth latches LAT1 to LATj may be operated in response to first to jth latch signals SG_lat1 to SG_latj. Some latches among the first to jth latches LAT1 to LATj may be connected to the column decoder (150 shown in FIG. 1) through the column line CL shown in FIG. 1.

The negative circuit NEG may be configured to discharge the first node N1 or generate a negative voltage in response to a negative signal #SG_neg. The negative signal #SG_neg may vary according to the first to mth bit line groups GR1 to GRm. For example, a level of the negative voltage generated by the negative circuit NEG may be changed according to the negative signal #SG_neg.

The sensing signal PBSENSE #, the precharge signal #SG_pre, the transmission signal SG_trn, the first to jth latch signals SG_lat1 to SG_latj, and the negative signal #SG_neg may be included in the page buffer control signals PBSIG. The page buffer control signals PBSIG may be adjusted by the page buffer control circuit (180A shown in FIG. 1) included in the control circuit (180 shown in FIG. 1).

Figure 8:
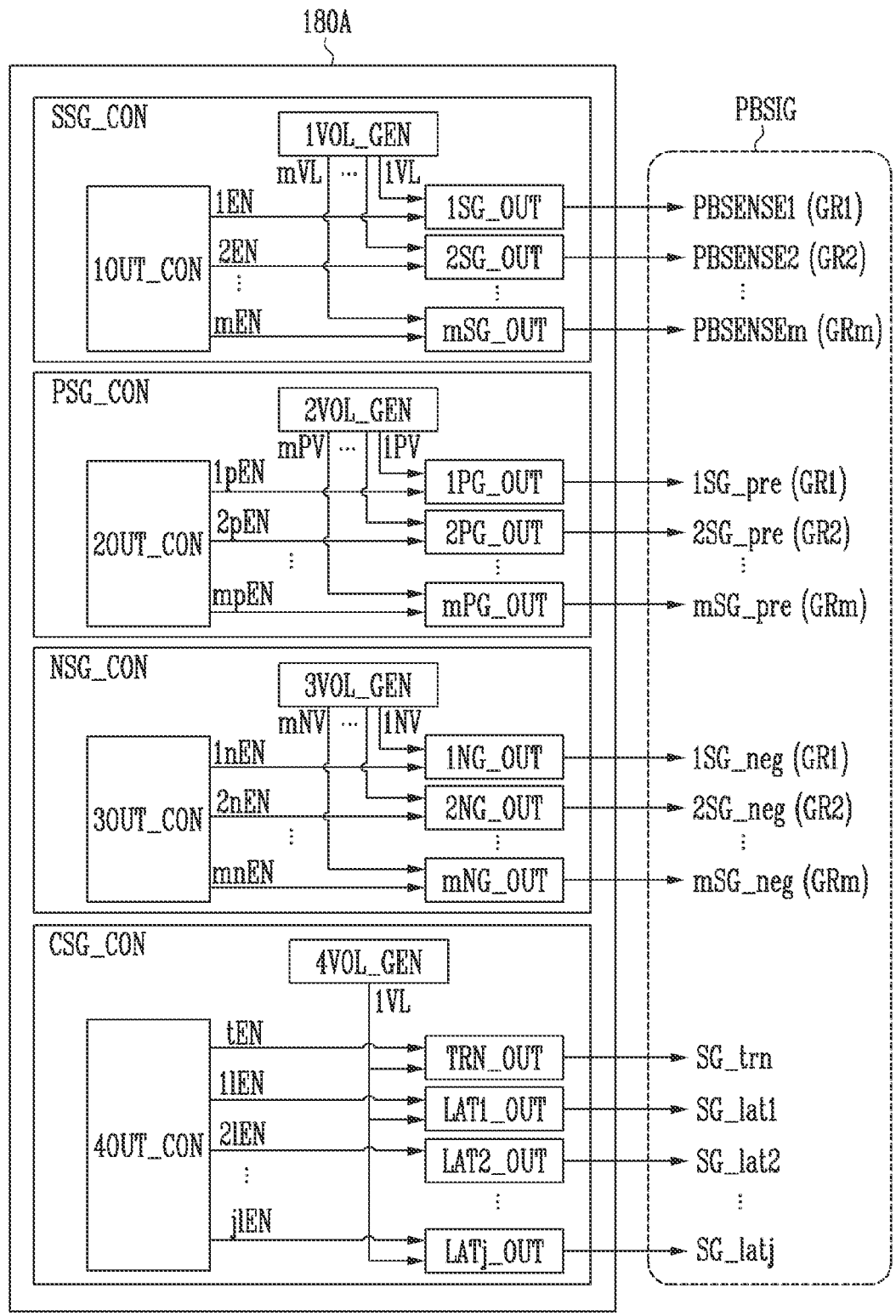
FIG. 8 is a diagram illustrating a page buffer control circuit.

FIG. 8 is a diagram illustrating a page buffer control circuit.

Referring to FIG. 8, the page buffer control circuit 180A may include a sensing signal controller SSG_CON, a precharge signal controller PSG_CON, a negative signal controller NSG_CON, and a common signal controller CSG_CON. The sensing signal controller SSG_CON may be configured to output first to mth sensing signals PBSENSE1 to PBSENSEm to be transmitted to page buffers corresponding to each of the first to mth bit line groups GR1 to GRm. The precharge signal controller PSG_CON may be configured to output first to mth precharge signals 1SG_pre to mSG_pre to be transmitted to page buffers corresponding to each of the first to mth bit line groups GR1 to GRm. The negative signal controller NSG_CON may be configured to output first to mth negative signals 1SG_neg to mSG_neg to be transmitted to page buffers corresponding to each of the first to mth bit line groups GR1 to GRm. The common signal controller CSG_CON may be configured to output a transmission signal SG_trn and first to jth latch signals SG_lat1 to SG_latj, which are to be commonly transmitted to the first to nth page buffers (PB1 to PBn shown in FIG. 6) regardless of the first to mth bit line groups GR1 to GRm.

The sensing signal controller SSG_CON may include a first voltage generating circuit 1VOL_GEN, a first output time control circuit 1OUT_CON, and first to mth sensing signal output circuits 1SG_OUT to mSG_OUT. The first voltage generating circuit 1VOL_GEN and the first output time control circuit 1OUT_CON may be operated under the control of the control circuit (180 shown in FIG. 1), and the first to mth sensing signal output circuits 1SG_OUT to mSG_OUT may be operated under the control of the first voltage generating circuit 1VOL_GEN and the first output time control circuit 1OUT_CON.

The first voltage generating circuit 1VOL_GEN may be configured to generate first to mth voltages 1VL to mVL having various levels, and transmit the generated first to mth voltages 1VL to mVL to each of the first to mth sensing signal output circuits 1SG_OUT to mSG_OUT.

The first output time control circuit 1OUT_CON may configured to selectively output first to mth sensing enable signals 1EN to mEN such that the first to mth sensing signal output circuits 1SG_OUT to mSG_OUT output the first to mth sensing signals PBSENSE1 to PBSENSEm at a set time.

The first to mth sensing signal output circuits 1SG_OUT to mSG_OUT may be configured to be respectively supplied with the first to mth voltages 1VL to mVL generated by the first voltage generating circuit 1VOL_GEN, and output the first to mth sensing signals PBSENSE1 to PBSENSEm in response to the first to mth sensing enable signals 1EN to mEN output from the first output time control circuit 1OUT_CON. For example, the first sensing signal PBSENSE1 output from the first sensing signal output circuit 1SG_OUT may be commonly input to the first to fourth page buffers (PB1 to PB4 shown in FIG. 6) corresponding to the first bit line group GR1, and the second sensing signal PBSENSE2 output from the second sensing signal output circuit 2SG_OUT may be commonly input to the fifth to eighth page buffers (PB5 to PB8 shown in FIG. 6) corresponding to the second bit line group GR2. In this manner, the mth sensing signal PBSENSEm output from the mth sensing signal output circuit mSG_OUT may be commonly input to (n−3)th to nth page buffers (PBn−3 to PBn shown in FIG. 6) corresponding to the mth bit line group GRm.

That is, voltage levels of the first to mth sensing signals PBSENSE1 to PBSENSEm output from the first to mth sensing signal output circuits 1SG_OUT to mSG_OUT may be different from one another, and times at which the first to mth sensing signals PBSENSE1 to PBSENSEm are output may be different from one another.

The precharge signal controller PSG_CON may include a second voltage generating circuit 2VOL_GEN, a second output time control circuit 2OUT_CON, and first to mth precharge signal output circuits 1PG_OUT to mPG_OUT. The second voltage generating circuit 2VOL_GEN and the second output time control circuit 2OUT_CON may be operated under the control of the control circuit (180 shown in FIG. 1), and the first to mth precharge signal output circuits 1PG_OUT to mPG_OUT may be operated under the control of the second voltage generating circuit 2VOL_GEN and the second output time control circuit 2OUT_CON.

The second voltage generating circuit 2VOL_GEN may be configured to generate first to mth precharge voltages 1PV to mPV having various levels, and transmit the generated voltages to each of the first to mth precharge signal output circuits 1PG_OUT to mPG_OUT.

The second output time control circuit 2OUT_CON may be configured to selectively output first to mth precharge enable signals 1$p$EN to m$p$EN such that first to mth precharge signal output circuits 1PG_OUT to mPG_OUT output the first to mth precharge signals 1SG_pre to mSG_pre at a set time.

The first to mth precharge signal output circuits 1PG_OUT to mPG_OUT configured to respectively supply the first to mth precharge voltages 1PV to mPV generated by the second voltage generating circuit 2VOL_GEN, and output the first to mth precharge signals 1SG_pre to mSG_pre in response to the first to mth precharge enable signals 1$p$EN to m$p$EN output from the second output time control circuit 2OUT_CON. For example, the first precharge signal 1SG_pre output from the first precharge signal output circuit 1PG_OUT may be commonly input to the first to fourth page buffers (PB1 to PB4 shown in FIG. 6) corresponding to the first bit line group GR1, and the second precharge signal 2SG_pre output from the second precharge signal output circuit 2PG_OUT may be commonly input to the fifth to eighth page buffers (PB5 to PB8 shown in FIG. 6) corresponding to the second bit line group GR2. In this manner, the mth precharge signal mSG_pre output from the mth precharge signal output circuit mPG_OUT may be commonly input to the (n−3)th to nth page buffers (PBn−3 to PBn shown in FIG. 6) corresponding to the mth bit line group GRm.

That is, voltage levels of the first to mth precharge signals 1SG_pre to mSG_pre output from the first to mth precharge signal output circuits 1PG_OUT to mPG_OUT may be different from one another, and times at which the first to mth precharge signals 1SG_pre to mSG_pre are output may be different from one another.

The negative signal controller NSG_CON may include a third voltage generating circuit 3VOL_GEN, a third output time control circuit 3OUT_CON, and first to mth negative signal output circuits 1NG_OUT to mNG_OUT. The third voltage generating circuit 3VOL_GEN and the third output time control circuit 3OUT_CON may be operated under the control of the control circuit (180 shown in FIG. 1), and the first to mth negative signal output circuits 1NG_OUT to mNG_OUT may be operated under the control of the third voltage generating circuit 3VOL_GEN and the third output time control circuit 3OUT_CON.

The third voltage generating circuit 3VOL_GEN may configured to generate first to mth negative voltages 1NV to mNV having various levels, and transmit the generated voltages to each of the first to mth negative signal output circuits 1NG_OUT to mNG_OUT.

The third output time control signal 3OUT_CON may be configured to selectively output first to mth negative enable signals 1nEN to mnEN such that the first to mth negative signal output circuits 1NG_OUT to mNG_OUT output the first to mth negative signals 1SG_neg to mSG_neg at a set time.

The first to mth negative signal output circuits 1NG_OUT to mNG_OUT may be configured to be respectively supplied with the first to mth negative voltages 1NV to mNV generated by the third voltage generating circuit 3VOL_GEN, and output the first to mth negative signals 1SG_neg to mSG_neg in response to the first to mth negative enable signals 1nEN to mnEN output from the third output time control circuit 3OUT_CON. For example, the first negative signal 1SG_neg output from the first negative signal output circuit 1NG_OUT may be commonly input to the first to fourth page buffers (PB1 to PB4 shown in FIG. 6) corresponding to the first bit line group GR1, and the second negative signal 2SG_neg output from the second negative signal output circuit 2NG_OUT may be commonly input to the fifth to eighth page buffers (PB5 to PB8 shown in FIG. 6) corresponding to the second bit line group GR2. In this manner, the mth negative signal mSG_neg output from the mth negative signal out circuit mNG_OUT may be commonly input to the (n−3)th to nth page buffers (PBn−3 to PBn shown in FIG. 6) corresponding to the mth bit line group GRm.

That is, voltage levels of the first to mth negative signals 1SG_neg to mSG_neg output from the first to mth negative signal output circuits 1NG_OUT to mNG_OUT may be different from one another, and times at which the first to mth negative signals 1SG_neg to mSG_neg are output may be different from one another.

The common signal controller CSG_CON may include a fourth voltage generating circuit 4VOL_GEN, a fourth output time control circuit 4OUT_CON, a transmission signal output circuit TRN_OUT, and first to jth latch signal output circuits LAT1_OUT to LATj_OUT. The fourth voltage generating circuit 4VOL_GEN and the fourth output time control circuit 4OUT_CON may be operated under the control of the control circuit (180 shown in FIG. 1), and the transmission signal output circuit TRN_OUT and the first to jth latch signal output circuits LAT1_OUT to LATj_OUT may be operated under the control of the fourth voltage generating circuit 4VOL_GEN and the fourth output time control circuit 4OUT_CON.

The fourth voltage generating circuit 4VOL_GEN may be configured to generate a first voltage 1VL, and transmit the generated first voltage 1VL to transmission signal output circuit TRN_OUT and the first to jth latch signal output circuits LAT1_OUT to LATj_OUT. The fourth voltage generating circuit 4VOL_GEN may be configured to generate voltages having various levels in addition to the first voltage 1VL.

The fourth output time control circuit 4OUT_CON may be configured to selectively output a transmission enable signal tEN and first to jth latch enable signals 1/EN to j1EN such that the first to jth latch signal output circuits LAT1_OUT to LATj_OUT output the transmission signal SG_trn and the first to jth latch signals SG_lat1 to SG_latj at a set time.

The transmission signal output circuit TRN_OUT and the first to jth latch signal output circuits LAT1_OUT to LATj_OUT may be configured to be supplied with the first voltage 1VL generated by the fourth voltage generating circuit 4VOL_GEN, and selectively output the transmission enable signal tEN and the first to jth latch enable signals 1/EN to j1EN in response to each of the transmission enable signal tEN and the first to jth latch enable signals 1/EN to j1EN, which are output from the fourth output time control circuit 4OUT_CON. For example, the transmission signal SG_trn output from the transmission signal output circuit TRN_OUT may be commonly input to the first to nth page buffers (PB1 to PBn shown in FIG. 6). In this manner, the signals output from the common signal controller CSG_CON may be commonly input to the first to nth page buffers PB1 to PBn.

A method of applying voltages to bit lines when an erase, read, or program operation is performed in the above-described memory device will be described as follows.

Figure 9:
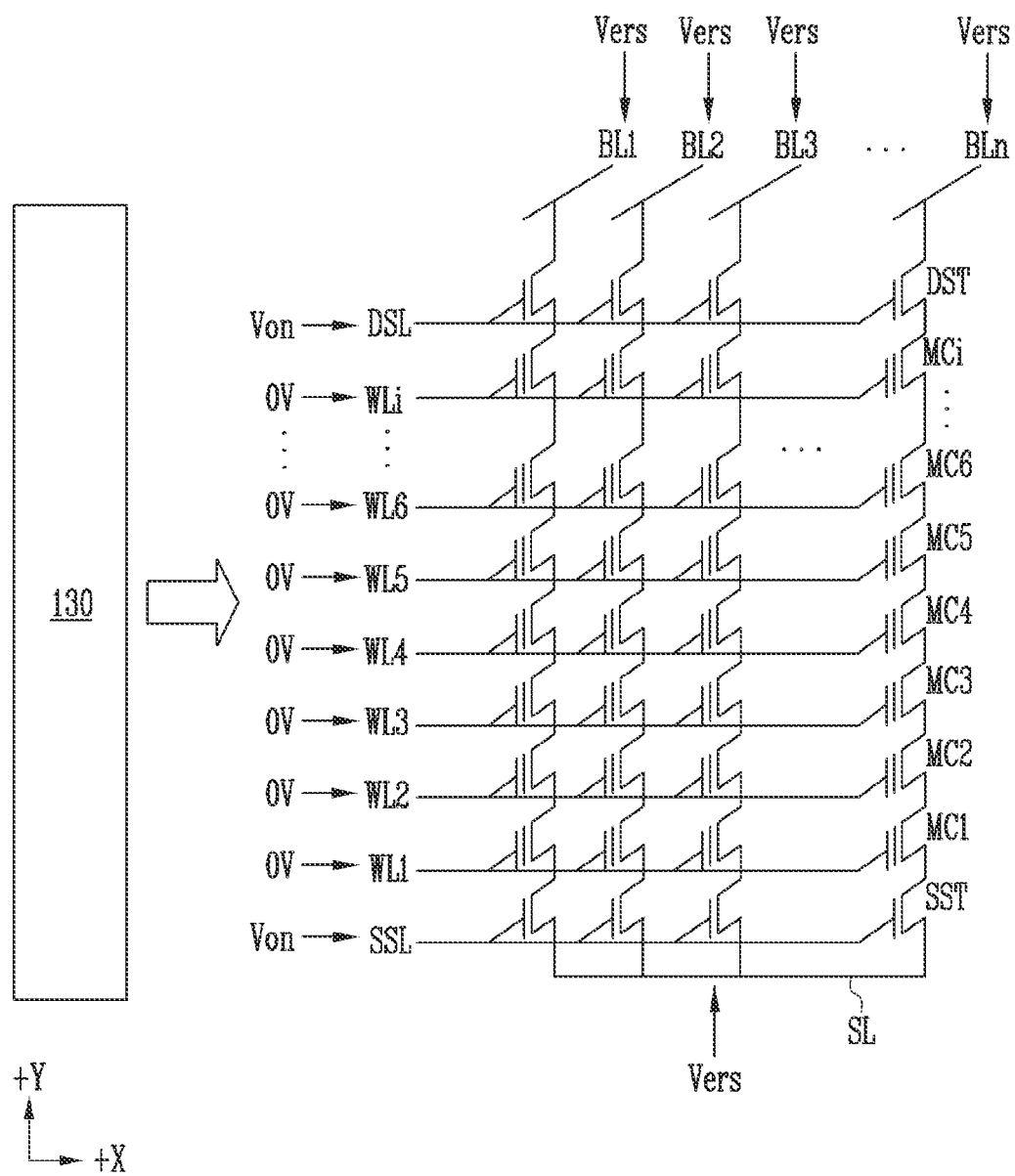
FIG. 9 is a diagram illustrating voltages applied to a selected memory block in an erase operation.
Figure 10A:
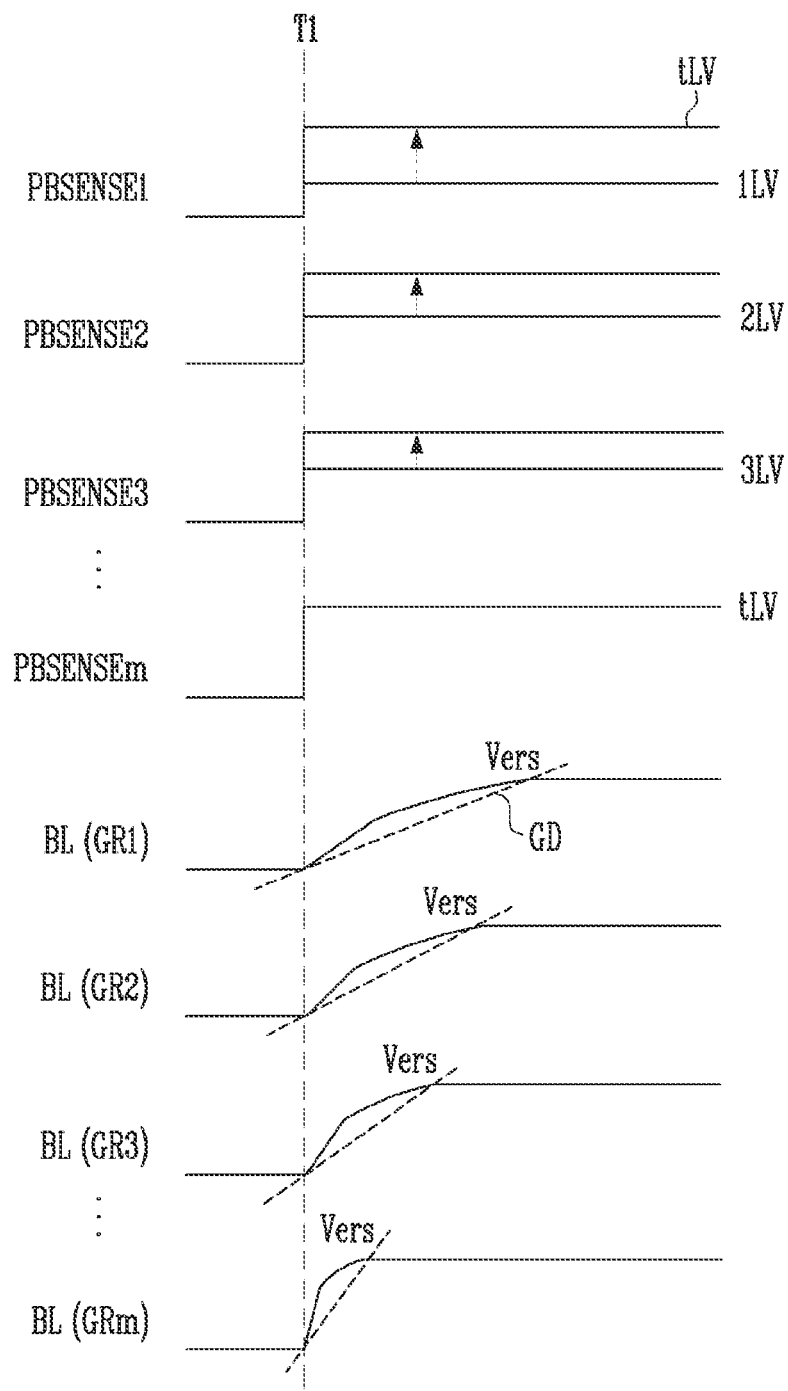
FIG. 10A is a diagram illustrating a first embodiment in which an erase voltage is applied to the bit lines in the erase operation.
Figure 10B:
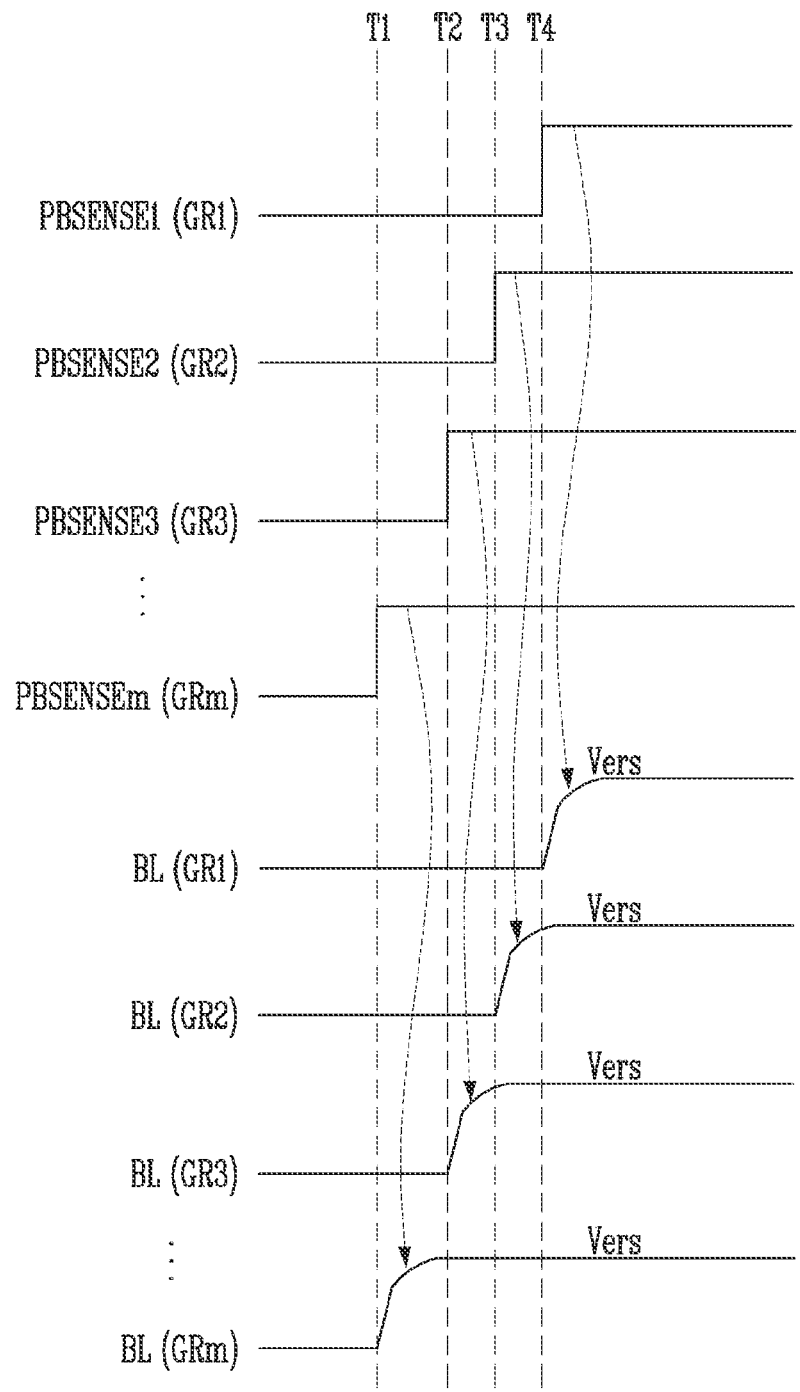
FIG. 10B is a diagram illustrating a second embodiment in which an erase voltage is applied to the bit lines in the erase operation.

FIG. 9 is a diagram illustrating voltages applied to a selected memory block in an erase operation. FIG. 10A is a diagram illustrating a first embodiment in which an erase voltage is applied to the bit lines in the erase operation. FIG. 10B is a diagram illustrating a second embodiment in which an erase voltage is applied to the bit lines in the erase operation.

Referring to FIGS. 9 and 10A, an erase voltage Vers may be applied to first to nth bit lines BL1 to BLn, a turn-on voltage Von may be applied to drain and source select lines DSL and SSL, and an erase allow voltage (0V) may be applied to first to ith word lines WL1 to WLi.

In the erase operation, the first to mth sensing signals PBSENSE1 to PBSENSEm may be simultaneously enabled at a first time T1, so that the erase voltage Vers is simultaneously applied to the bit line BL. A speed at which the erase voltage Vers is increased may be changed according to distances between the row decoder group 130 and the bit lines BL. That is, a gradient GD with which the erase voltage Vers is increased may be differently set according to the distances between the row decoder group 130 and the bit lines BL. For example, in bit lines BL of the first bit line group GR1, of which distances from the row decoder group 130 are close, the gradient GD of the erase voltage Vers may be lowest, and become higher as the distance becomes more distant. That the gradient GD of the erase voltage Vers is low means that a time required for the erase voltage Vers to be increased to a target level is long. That the gradient GD of the erase voltage Vers is high means that the time required for the erase voltage Vers to be increased to a target level is short. The gradient GD with which the erase voltage is increased may vary according to voltage levels of the first to mth sensing signals PBSENSE1 to PBSENSEm.

When the erase voltage Vers is applied to the bit lines BL and the turn-on voltage Von is applied to the drain select line DSL, a voltage difference between the bit lines BL and the drain select line DSL increases while the voltage of the bit lines BL is increased. When the voltage difference between the bit lines BL and the drain select line DSL reaches a specific level, the pass transistor (PT shown in FIG. 5) connected to the drain select line DSL may be turned off.

When the pass transistor PT connected to the drain select line DSL is turned off, the drain select line DSL may be floated, and the voltage of the drain select line DSL may be increased due to coupling to the erase voltage applied to the bit lines BL.

In the first embodiment, in order to prevent occurrence of over-erase in strings of the first bit line group GR1 close to the row decoder group 130, an erase voltage Vers applied to the bit lines BL included in the first bit line group GR1 may be adjusted such that the erase voltage Vers is increased relatively late. For example, a gradient GD of the erase voltage Vers applied to the bit lines BL included in the first bit line group GR1 may be set lowest, and a gradient GD of an erase voltage Vers applied to bit lines BL included in the mth bit line group GRm distant from the row decoder group 130 may be set highest. For example, in order to lower the gradient of the erase voltage Vers applied to the bit lines BL included in the first bit line group GR1, the voltage level of the first sensing signal PBSENSE1 is increased to a target level tLV, starting with a first level 1LV lower than the target level tLV. The voltage level of the second sensing signal PBSENSE2 is increased to the target level tLV, starting with a second level 2LV between the target level tLV and the first level 1LV. The voltage level of the third sensing signal PBSENSE3 is increased to the target level tLV, starting with a third level 3LV between the target level tLV and the second level 2LV. In this manner, start levels of sensing signals are set different from each other, and the voltage level is gradually increased from a start level to the target level, so that the gradient GD of the erase voltage Vers applied to the bit lines BL can be adjusted. A start level of the mth sensing signal PBSENSEm may be set identically to the target level tLV.

Accordingly, erase depths of memory cells included in the selected memory cells may become similar to each other. The erase depth means a degree to which a threshold voltage of the memory cells is lowered. For example, since that the erase depth becomes deep means a state in which the erase operation is excessively performed, the threshold voltage of the memory cells is excessively lowered. On the contrary, since that the erase depth becomes shallow means a state in which the erase operation is weakly performed, the threshold voltage of the memory cells is not sufficiently lowered.

Thus, in the first embodiment, the gradient GD of the erase voltage Vers applied to the bit lines BL be more sharply adjusted as the distances from the row decoder group 130 become more distant, so that the memory cells of the selected memory block can be erased in states similar to one another.

Referring to FIGS. 9 and 10B, in the second embodiment, the gradient of the erase voltage Vers applied to the bit lines BL may be equally maintained, and the times at which the erase voltage Vers is applied to the bit lines BL may be adjusted. For example, as the distances from the row decoder group 130 become more distant, the times at which the erase voltage Vers is applied to the bit lines BL may be set earlier. As the distances from the row decoder group 130 become closer, the times at which the erase voltage Vers is applied to the bit lines BL may be set later. In order to adjust the times at which the erase voltage Vers is applied to the bit lines BL, an enable time of sensing signals may be adjusted. For example, it is assumed that the first sensing signal PBSENSE1 is applied to page buffers corresponding to the first bit line group GR1, the second sensing signal PBSENSE2 is applied to page buffers corresponding to the second bit line group GR2, the third sensing signal PBSENSE3 is applied to page buffers corresponding to the third bit line group GR3, and the mth sensing signal PBSENSEm is applied to page buffers corresponding to the mth bit line group GRm. The mth sensing signal PBSENSEm applied to bit lines BL of which distance from the row decoder group 130 is most distant may be enabled at a first time T1, and the other sensing signals may be sequentially enabled after the first time T1. For example, the third sensing signal PBSENSE3 may be enabled at a second time T2 later than the first time T1, the second sensing signal PBSENSE2 may be enabled at a third time T3 later than the second time T2, and the first sensing signal PBSENSE1 may be enabled at a fourth time T4 later than the third time T3. Therefore, the erase voltage Vers may be applied earliest to the bit lines BL included in the mth bit line groups GRm. The erase voltage Vers may be applied latest to the bit lines BL included in the first bit line group GR1. Accordingly, the memory cells of the selected memory block can be erased in states similar to one another.

Figure 11:
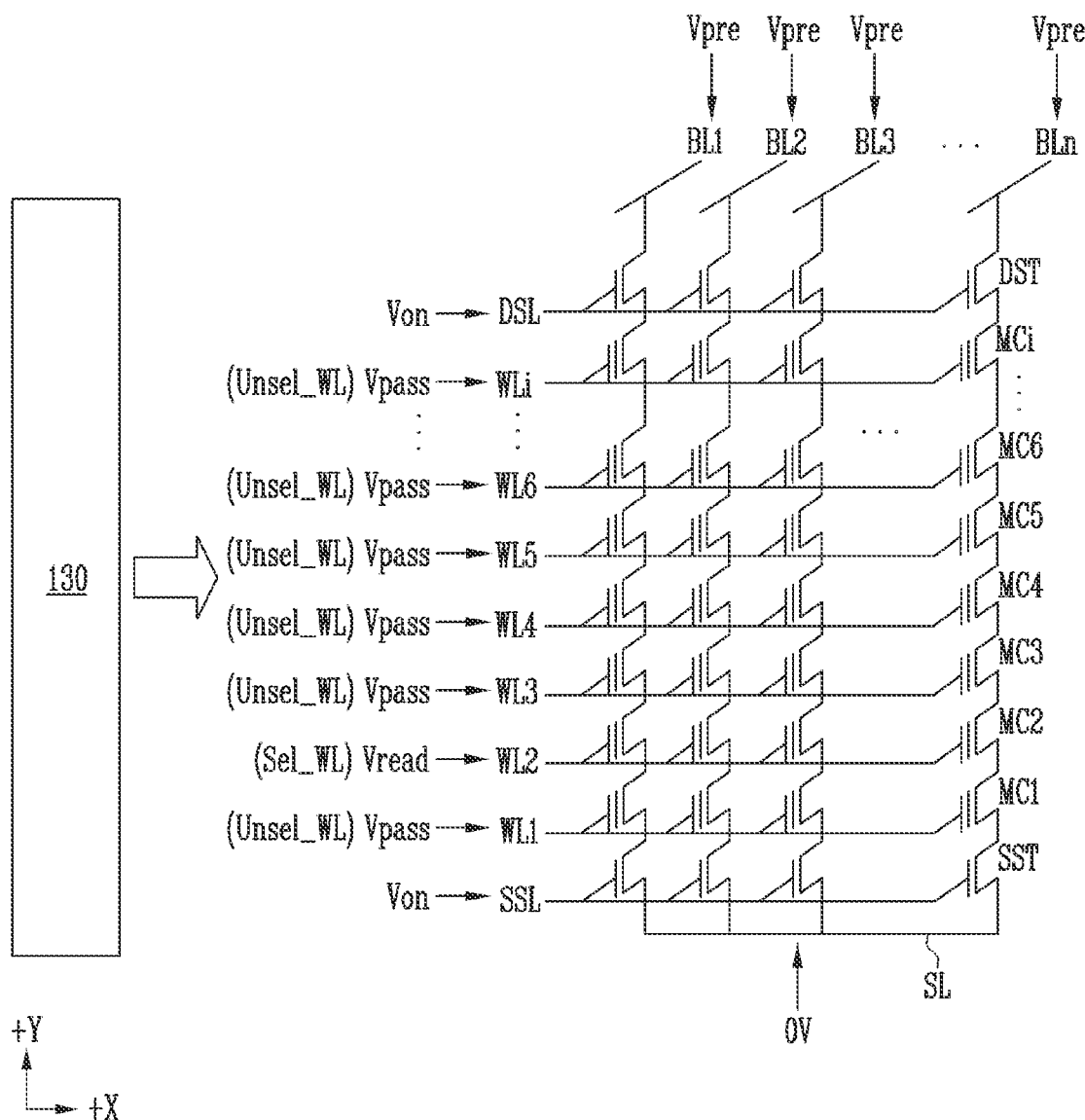
FIG. 11 is a diagram illustrating voltages applied to a selected memory block in a read operation.
Figure 12:
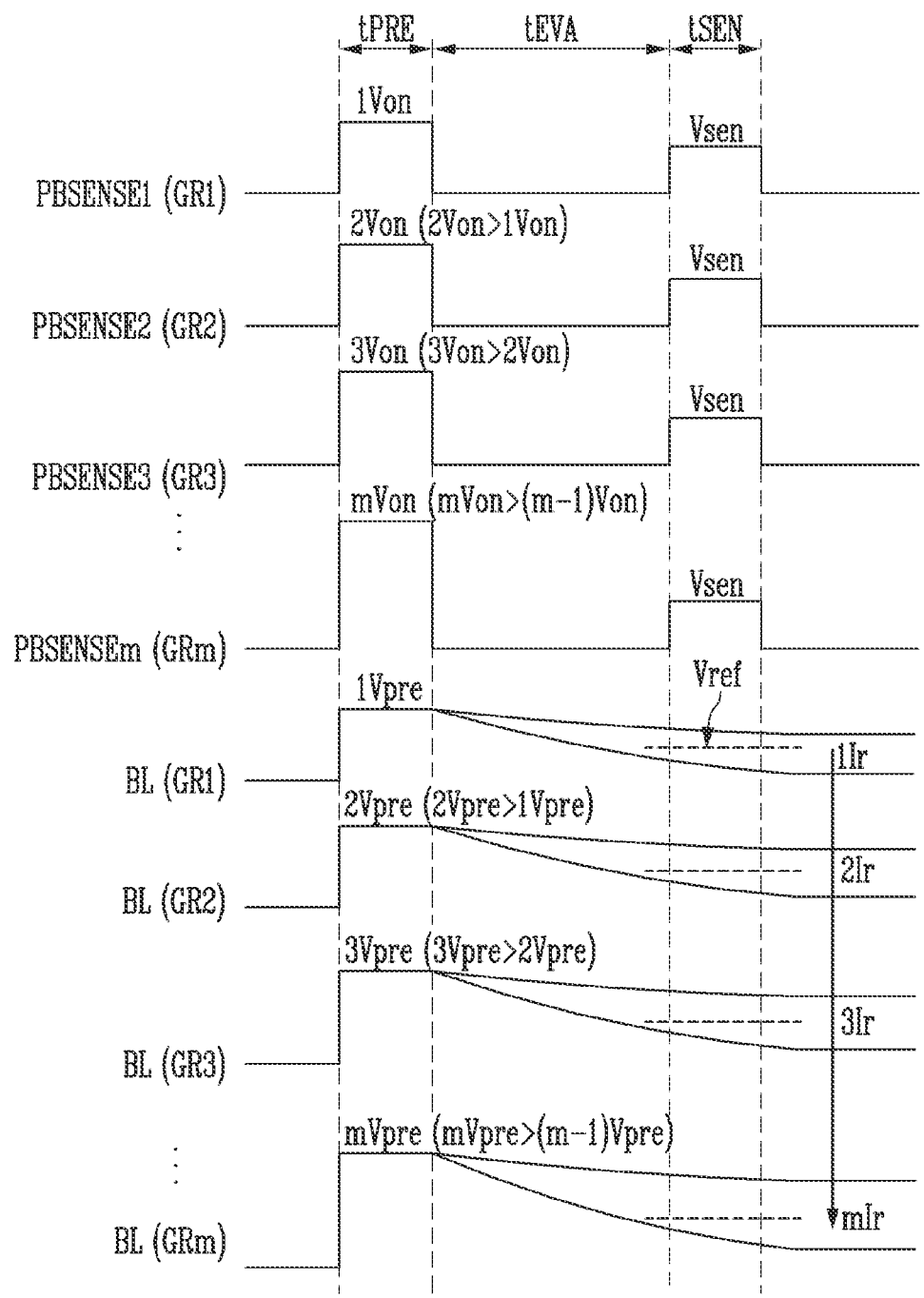
FIG. 12 is a diagram illustrating a method of applying a precharge voltage to the bit lines in the read operation.

FIG. 11 is a diagram illustrating voltages applied to a selected memory block in a read operation. FIG. 12 is a diagram illustrating a method of applying a precharge voltage to the bit lines in the read operation.

Referring to FIGS. 11 and 12, in the read operation, a precharge voltage Vpre may be applied to bit lines BL1 to BLn, and a turn-on voltage Von may be applied to a drain select line DSL and a source select line SSL. When assuming that a second word line WL2 among first to ith word lines WL1 to WLi is a selected word line Sel_WL and the other first and third to ith word lines WL1 and WL3 to WLi are unselected word lines Unsel_WL, a read voltage Vread may be applied to the selected word line Sel_WL, and a pass voltage Vpass may be applied to the unselected word lines Unsel_WL. A voltage of 0V may be applied to the source line SL such that current flows in a channel.

In the read operation, a current of bit lines BL, which varies according to a threshold voltage of memory cells connected to the selected word line Sel_WL, is sensed. Since the read voltage Vread is transferred to the row decoder group 130, a time required for the read voltage Vread to be increased to a target level may become longer as distances from the row decoder group 130 become more distant.

Therefore, in this embodiment, a relatively high precharge voltage is applied to a bit line of which distance from the row decoder group 130 is distant, and a relatively low precharge voltage is applied to a bit line of which distance from the row decoder group 130 is close.

In a precharge period tPRE during the read operation, the first to mth sensing signals PBSENSE1 to PBSENSEm having different levels may be simultaneously enabled in a state in which a highest mth precharge voltage mVpre is applied to the first node (N1 shown in FIG. 7) of each page buffer. The first sensing signal PBSENSE1 corresponding to the first bit line group GR1 of which distance from the row decoder group 130 is close may have a first turn-on voltage 1Von which is lowest among turn-on voltages. The second sensing signal PBSENSE2 corresponding to the second bit line group GR2 of which distance from the row decoder group 130 is more distant than the first bit line group GR1 may have a second turn-on voltage 2Von higher than the first turn-on voltage 1Von. The mth sensing signal PBSENSEm corresponding to the mth bit line group GRm of which distance from the row decoder group is most distant may have an mth turn-on voltage mVon which is highest among the turn-on voltages. Therefore, a first precharge voltage 1Vpre may be applied to bit lines BL included in the first bit line group GR1, a second precharge voltage 2Vpre higher than the first precharge voltage 1Vpre may be applied to bit lines BL included in the second bit line group GR2, a third precharge voltage 3Vpre higher than the second precharge voltage 2Vpre may be applied to bit lines BL included in the third bit line group GR3, and a highest mth precharge voltage mVpre may be applied to bit lines BL included in the mth bit line group GRm.

In an evaluation period tEVA after the precharge period tPRE, the first to mth sensing signals PBSENSE1 to PBSENSEm may be inactivated, and a voltage of the bit lines BL may be changed according to a threshold voltage of selected memory cells. A voltage of bit lines BL connected to memory cells of which threshold voltage is lower than the read voltage Vread becomes equal to or lower than a reference voltage Vref for sorting data through a current path of a channel. Since memory cells of which threshold voltage is higher than the read voltage Vread are turned off, the voltages of the bit lines BL are maintained as the first to mth precharge voltages 1Vpre to mVpre, or do not become equal to or lower than the reference voltage Vref even when the voltages of the bit lines BL become low.

In a sensing period tSEN after the evaluation period tEVA, the first to mth sensing signals PBSENSE1 to PBSENSEm may be enabled with a sensing voltage Vsen as a positive voltage to sense a current of the bit lines BL. The sensing voltage Vsen may be set as a positive voltage lower than the first turn-on voltage 1Von. When the first to mth sensing signals PBSENSE1 to PBSENSEm are enabled, page buffers may sense the current of the bit lines BL, and store data of the selected memory cells. A lowest first current 1Ir may flow in the bit lines BL of the first bit line group GR1 due to the first precharge voltage 1Vpre or a voltage slightly lower than the first precharge voltage 1Vpre, and a highest mth current mIr may flow in the bit lines BL of the mth bit line group GRm. Accordingly, a phenomenon can be prevented, in which a threshold voltage of memory cells is sensed higher than a normal level in the mth bit line group GRm of which distance from the row decoder group 130 is distant.

Figure 13:
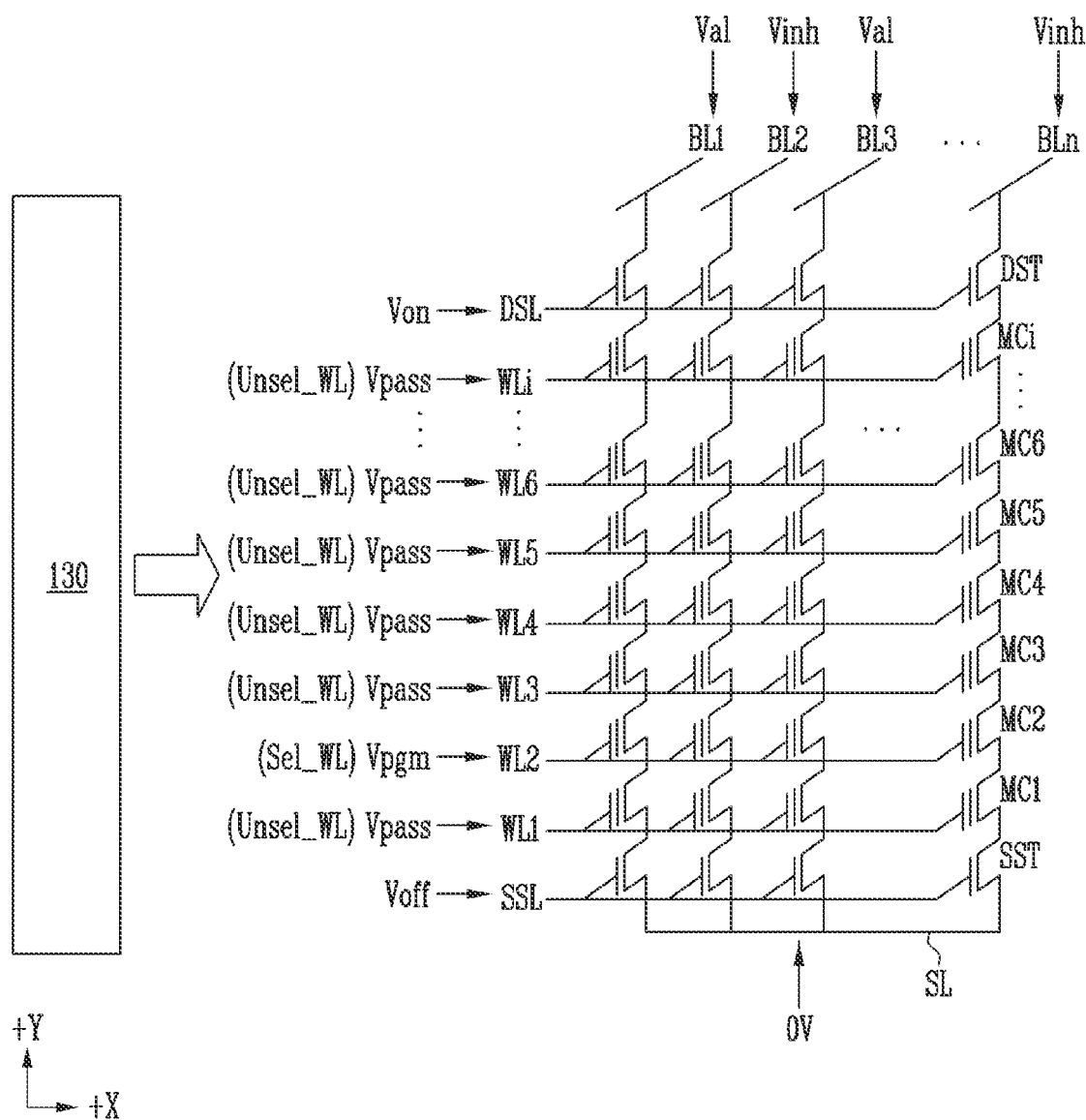
FIG. 13 is a diagram illustrating voltages applied to a selected memory block in a program operation.
Figure 14:
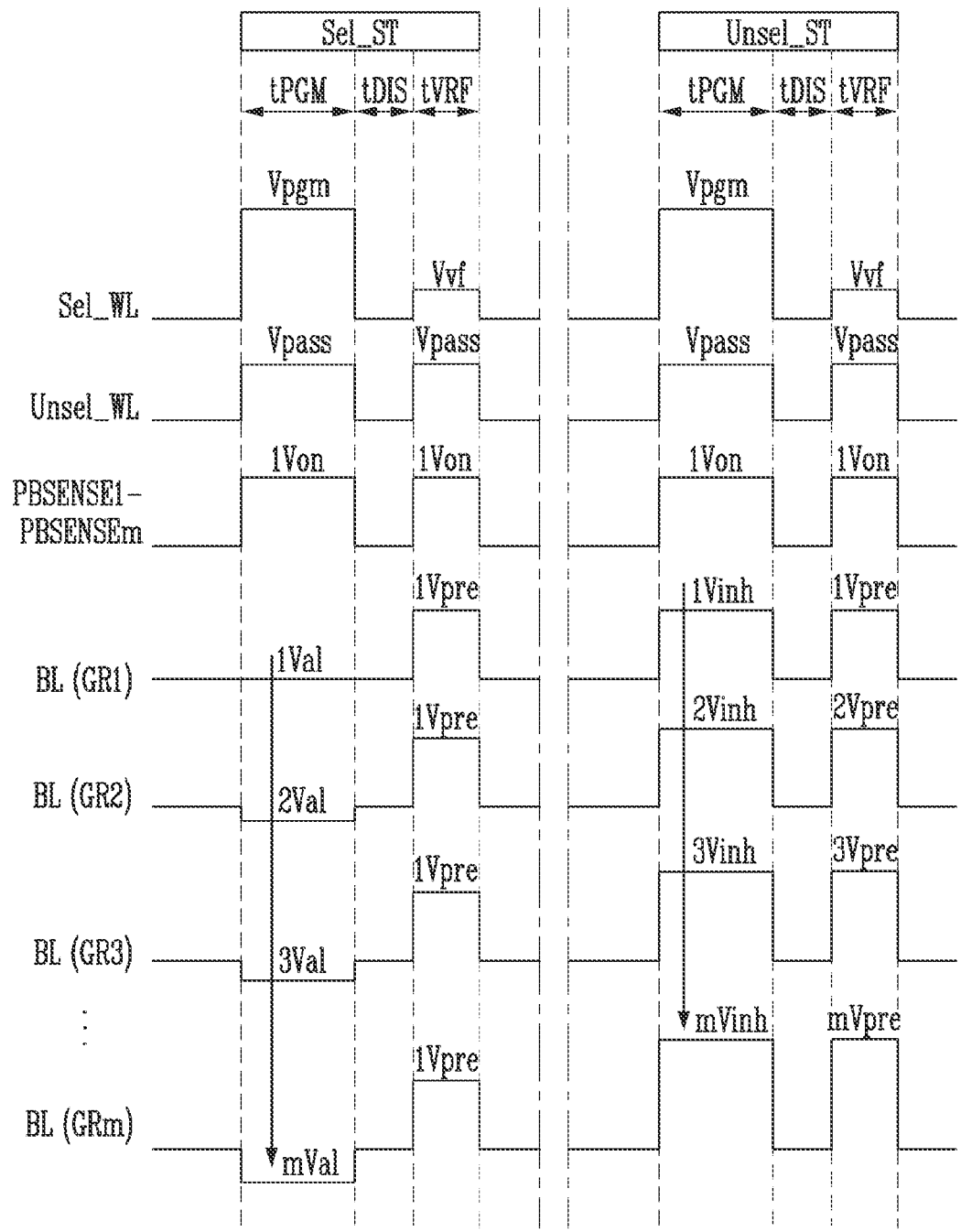
FIG. 14 is a diagram illustrating a method of applying a program allow voltage or a program inhibit voltage to the bit lines in the program operation.

FIG. 13 is a diagram illustrating voltages applied to a selected memory block in a program operation. FIG. 14 is a diagram illustrating a method of applying a program allow voltage or a program inhibit voltage to the bit lines in the program operation.

Referring to FIGS. 13 and 14, in the program operation, a program allow voltage Val or a program inhibit voltage Vinh may be applied to bit lines BL. The program allow voltage Val is a voltage applied to bit lines connected to selected strings Sel_ST, and the program inhibit voltage Vinh is a voltage applied to bit lines connected to unselected strings Unsel_ST. A turn-on voltage Von may be applied to a drain select line DSL, and a turn-off voltage Voff may be applied to a source select line SSL. When assuming that a second word line WL2 among first to ith word lines WL1 to WLi is a selected word line Sel_WL and the other first and third to ith word lines WL1 and WL3 to WLi are unselected word lines Unsel_WL, a program voltage Vpgm may be applied to the selected word line Sel_WL, and a pass voltage Vpass may be applied to the unselected word lines Unsel_WL.

In the program operation, a plurality of program loops may be performed until a threshold voltage of selected memory cells reaches a target voltage. Each of the program loops may be configured with a program period tPGM, a discharge period tDIS, and a verify period tVRF.

In the program period tPGM, the program voltage Vpgm may be applied to the selected word line Sel_WL, and the pass voltage Vpass may be applied to the unselected word lines Unsel_WL. In order to apply the program allow voltage to the bit lines BL, the first to mth sensing signals PBSENSES1 to PBSENSEm having a first turn-on voltage 1Von may be enabled. As distances from the row decoder group 130 become more distant, the program voltage Vpgm applied to the selected word line Sel_WL may become lower. Therefore, as the distances from the row decoder group 130 become more distant, the program allow voltage applied to the bit lines BL may be set lower. For example, a highest first program allow voltage 1Val among program allow voltages may be applied to bit lines BL included in the first bit line group GR1, a second program allow voltage 2Val lower than the first program allow voltage 1Val may be applied to bit lines BL included in the second bit line group GR2, a third program allow voltage 3Val lower than the second program allow voltage 2Val may be applied to bit lines BL included in the third bit line group GR3, and a lowest mth program allow voltage mVal may be applied to bit lines BL included in the mth bit light group GRm.

In the program period tPGM, the program inhibit voltage may be applied to the unselected word lines Unsel_WL. When the distance of a string from the row decoder group 130 becomes more distant, channel boosting may be further deteriorated. Therefore, the program inhibit voltage may be set high. For example, a lowest first program inhibit voltage 1Vinh among program inhibit voltages may be applied to the bit lines BL included in the first bit line group GR1, a second program inhibit voltage 2Vinh higher than the first program inhibit voltage 1Vinh may be applied to the bit lines BL included in the second bit line group GR2, a third program inhibit voltage 3Vinh higher than the second program inhibit voltage 2Vinh may be applied to the bit lines BL included in the third bit line group GR3, and a highest mth program inhibit voltage mVinh may be applied to the bit lines BL included in the mth bit line group GRm.

In the discharge period tDIS, the selected word line Sel_WL and the unselected word lines Unsel_WL may be discharged, and the bit lines BL of the selected strings Sel_ST and the unselected strings Unsel_ST may be initialized.

In the verify period tVRF, a verify voltage Vvf may be applied to the selected word line Sel_WL, and the pass voltage Vpass may be applied to the unselected word lines Unsel_WL. In order to apply a precharge voltage to the bit lines BL, the first to mth sensing signals PBSENSE1 to PBSENSEm having the first turn-on voltage 1Von may be enabled. When the distance of a string from the row decoder group 130 becomes more distant, a current of the bit lines BL may become lower. Therefore, in order to compensate for a current change according to the distance, precharge voltages applied to the bit lines BL may be set to different levels. For example, a lowest first precharge voltage 1Vpre among precharge voltages may be applied to the bit lines BL included in the first bit line group GR1, a second precharge voltage 2Vpre higher than the first precharge voltage 1Vpre may be applied to the bit lines BL included in the second bit line group GR2, a third precharge voltage 3Vpre higher than the second precharge voltage 2Vpre may be applied to the bit lines BL included in the third bit line group GR3, and a highest mth precharge voltage mVpre may be applied to the bit lines BL included in the mth bit line group GRm.

Figure 15:
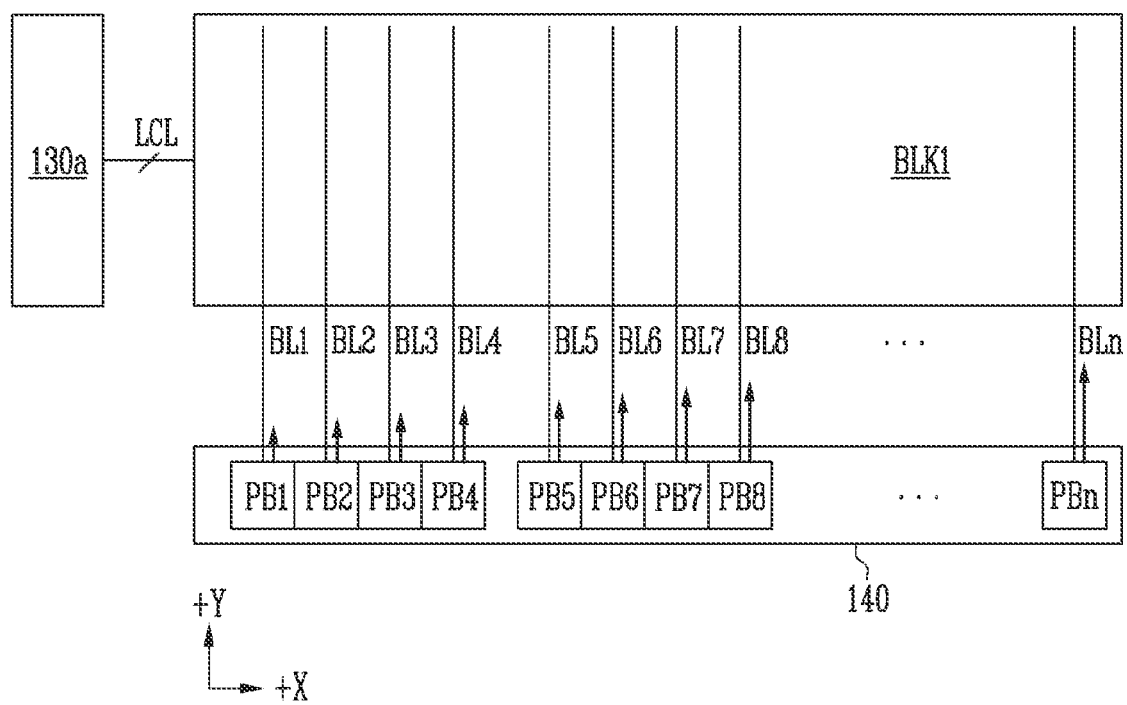
FIG. 15 is a diagram illustrating a voltage adjusting method of the bit lines in accordance with another embodiment of the present disclosure.

FIG. 15 is a diagram illustrating a voltage adjusting method of the bit lines in accordance with another embodiment of the present disclosure.

Referring to FIG. 15, as the distances from the first row decoder 130a become more distant, voltage applied to each of the first to nth bit lines BL1 to BLn may be adjusted. That is, the first to nth bit lines BL1 to BLn are not sorted in units of bit line groups, and levels of the voltages applied to each of the first to nth bit lines BL1 to BLn or times at which the voltages are applied may be adjusted. To this end, the first to nth page buffers PB1 to PBn connected to the first to nth bit lines BL1 to BLn may apply voltages to the first to nth bit lines BL1 to BLn at different times, or apply voltages having different levels to the first to nth bit lines BL1 to BLn.

Figure 16:
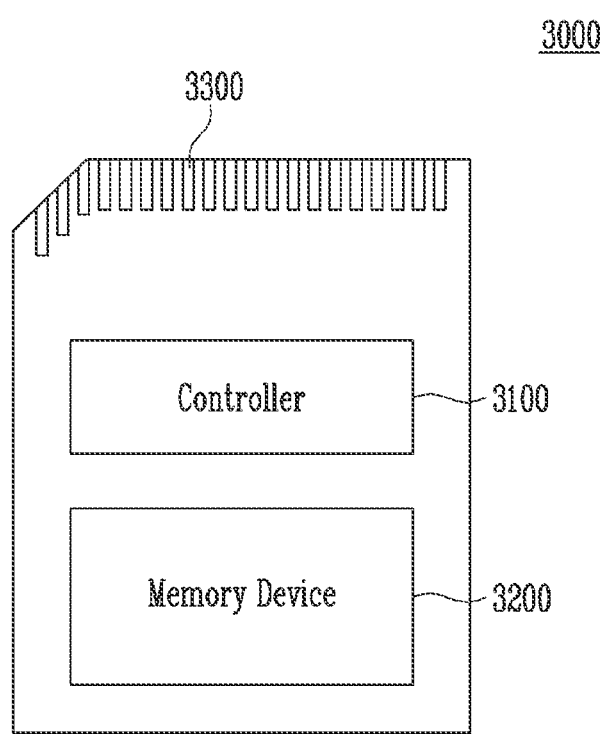
FIG. 16 is a diagram illustrating a memory card system to which the memory device is applied in accordance with an embodiment of the present disclosure.

FIG. 16 is a diagram illustrating a memory card system to which a memory device is applied in accordance with an embodiment of the present disclosure.

Referring to FIG. 16, a memory card system 3000 includes a controller 3100, a memory device 3200, and a connector 3300.

The controller 3100 may be connected to the memory device 3200. The controller 3100 may access the memory device 3200. For example, the controller 3100 may control a program, read, or erase operation, or control a background operation of the memory device 3200. The controller 3100 may provide an interface between the memory device 3200 and a host. The controller 3100 may drive firmware for controlling the memory device 3200. For example, the controller 3100 may include components such as Random Access Memory (RAM), a processing unit, a host interface, a memory interface, and the error corrector.

The controller 3100 may communicate with an external device through the connector 3300. The controller 3100 may communicate with the external device (e.g., the host) according to a specific communication protocol. For example, the controller 3100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. For example, the connector 3300 may be defined by at least one of the above-described various communication protocols.

The memory device 3200 may include memory cells, and be configured identically to the memory device 100 shown in FIG. 1. Therefore, the memory device 3200 may adjust voltages applied to bit lines as illustrated in the above-described embodiments.

The controller 3100 and the memory device 3200 may be integrated into a single semiconductor device, to constitute a memory card. For example, the controller 3100 and the memory device 3200 may constitute a memory card such as a personal computer (PC) card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 17:
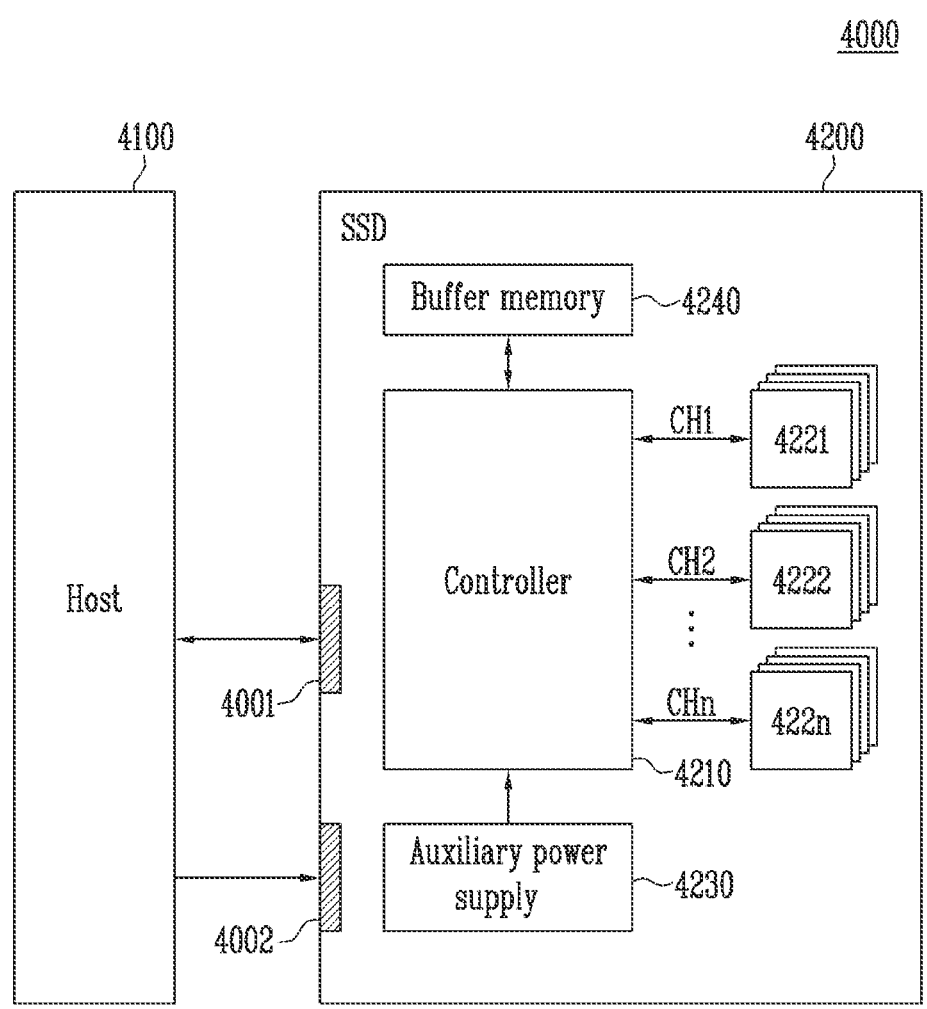
FIG. 17 is a diagram illustrating a Solid State Drive (SSD) system to which the memory device is applied in accordance with an embodiment of the present disclosure.

FIG. 17 is a diagram illustrating a Solid State Drive (SSD) system to which a memory device is applied in accordance with an embodiment of the present disclosure.

Referring to FIG. 17, an SSD system 4000 includes a host 4100 and an SSD 4200. The SSD 4200 exchanges a signal with the host 4100 through a signal connector 4001 and receives power through a power connector 4002. The SSD 4200 includes a controller 4210, a plurality of memory devices 4221 to 422n, an auxiliary power supply 4230, and a buffer memory 4240.

The controller 4210 may control the plurality of memory devices 4221 to 422n in response to a signal received from the host 4100. For example, the signal may be a signal based on an interface between the host 4100 and the SSD 4200. For example, the signal may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The plurality of memory devices 4221 to 422n may include cells capable of storing data. Each of the plurality of memory devices 4221 to 422n may be configured identically to the memory device 100 shown in FIG. 1. Therefore, the plurality of memory devices 4221 to 422n may adjust voltages applied to bit lines as illustrated in the above-described embodiments.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. For example, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of memory devices 4221 to 422n, or temporarily store meta data (e.g., a mapping table) of the memory devices 4221 to 422n. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In accordance with the present disclosure, although the distances between a row decoder and bit lines increase, deterioration of the reliability of an erase, read, or program operation performed in the memory device can be prevented.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, some embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
a voltage generator configured to generate a plurality of operating voltages;
a row decoder configured to transmit the plurality of operating voltages to a memory block through local lines;
page buffers connected to the memory block through bit lines, the page buffers configured to apply voltages to the bit lines in response to page buffer control signals; and
a page buffer control circuit configured to output the page buffer control signals by adjusting levels of the voltages and times at which the voltages are applied to the bit lines according to distances of the bit lines from the row decoder,
wherein a relatively higher voltage is applied to a bit line that is relatively distant from the row decoder than to a bit line that is relatively close to the row decoder.

2. The memory device of claim 1, wherein the voltage generator is configured to generate, as the plurality of operating voltages, a program voltage, a pass voltage, a verify voltage, a read voltage, and an erase voltage.

3. The memory device of claim 1, wherein the row decoder is connected to the voltage generator through global lines and is configured to transmit the plurality of operating voltages to the local lines in response to a row address.

4. The memory device of claim 3, wherein the row decoder includes:
a high voltage generator configured to output a high voltage signal in response to the row address; and
pass transistors connected between the global lines and the local lines, the pass transistors being simultaneously operated in response to the high voltage signal.

5. The memory device of claim 1, wherein each of the page buffers includes:
latches configured to store data in response to a latch signal;
a precharge circuit configured to generate a precharge voltage or an erase voltage in response to a precharge signal;
a transmission circuit configured to connect or block the latches or the precharge circuit to or from a node in response to a transmission signal;
a negative circuit configured to discharge the node or generate a negative voltage in response to a negative signal; and
a switch configured to connect or block the node and a bit line to or from each other in response to a sensing signal.

6. The memory device of claim 5, wherein a turn-on level of the switch varies according to a voltage level of the sensing signal.

7. The memory device of claim 5, wherein the switch is configured to vary a level of the precharge voltage or the erase voltage, which is applied to the bit line, according to a voltage level of the sensing signal.

8. The memory device of claim 5, wherein the page buffer control circuit includes:
a sensing signal controller configured to output sensing signals according to the distances of the bit lines from the row decoder;
a precharge signal controller configured to output precharge signals according to the distances of the bit lines from the row decoder;
a negative signal controller configured to output negative signals according to the distances of the bit lines from the row decoder; and
a common signal controller configured to output transmission signals and latch signals regardless of the distances of the bit lines from the row decoder.

9. The memory device of claim 8, wherein the sensing signal controller includes:
a first voltage generating circuit configured to generate sensing voltages according to the distances of the bit lines from the row decoder;
a first output time control circuit configured to output sensing enable signals according to the distances of the bit lines from the row decoder; and
sensing signal output circuits configured to be supplied with the sensing voltages, and output the sensing signals in response to the sensing enable signals.

10. The memory device of claim 9, wherein, in an erase operation,
the first voltage generating circuit generates the sensing voltages having different start levels,
the first output time control circuit simultaneously outputs the sensing enable signals, and
the sensing signal output circuits output the sensing voltages as the sensing signals in response to the sensing enable signals, wherein the sensing signal output circuits output the sensing signals having relatively low start levels to page buffers of which distances of the bit lines from the row decoder are relatively close, and output the sensing signals have relatively high start levels to page buffers of which distances of the bit lines from the row decoder are relatively distant.

11. The memory device of claim 10, wherein, when sensing signals are output, the first voltage generating circuit is configured to increase levels of the sensing signals to a target level.

12. The memory device of claim 9, wherein, in an erase operation,
the first voltage generating circuit generates the sensing voltages having a target level,
the first output time control signal outputs the sensing enable signals at different times, and
the sensing signal output circuits output the sensing voltages as the sensing signals in response to the sensing enable signals, wherein the sensing signal output circuits output, relatively late, the sensing signals to page buffers of which distances of the bit lines from the row decoder are relatively close, and output, relatively early, the sensing signals to page buffers of which distances of the bit lines from the row decoder are relatively distant.

13. The memory device of claim 9, wherein, in a read operation,
the first voltage generating circuit generates the sensing voltages having different start levels, the first output time control circuit simultaneously outputs the sensing enable signals, and the sensing signal output circuits output the sensing voltages as the sensing signals in response to the sensing enable signals, wherein the sensing signal output circuits output relatively low sensing signals among the sensing signals to page buffers of which distances of the bit lines from the row decoder are relatively close, and output relatively high sensing signals among the sensing signals to page buffers of which distances of the bit lines from the row decoder are relatively distant.

14. The memory device of claim 8, wherein, in a program operation, the sensing signal controller simultaneously output the sensing signals having the same level, and the precharge signal controller outputs the precharge signals such that a relatively low program inhibit voltage is output from page buffers of which distances of the bit lines from the row decoder are relatively close, and outputs the precharge signals such that a relatively high program inhibit voltage is output from page buffers of which distances of the bit lines from the row decoder are relatively distant.

15. The memory device of claim 14, wherein page buffers connected to unselected strings among the page buffers apply the program inhibit voltages to the bit lines in response to the precharge signals.

* * * * *